(12) United States Patent  (10) Patent No.: US 8,010,502 B2
Jessee  (45) Date of Patent: Aug. 30, 2011

(54) METHODS AND SYSTEMS FOR DATA RECOVERY

(75) Inventor: Lucas John Jessee, Centreville, VA (US)

(73) Assignee: Harris Corporation, Melbourne, FL (US)

( * ) Notice: Subject to any disclaimer, the term of this patent is extended or adjusted under 35 U.S.C. 154(b) by 446 days.

(21) Appl. No.: 12/101,576

(22) Filed: Apr. 11, 2008

(65) Prior Publication Data

US 2008/0256139 A1  Oct. 16, 2008

Related U.S. Application Data

(60) Provisional application No. 60/911,664, filed on Apr. 13, 2007.

(51) Int. Cl.
G06F 17/30 (2006.01)
(52) U.S. Cl. ............................. 707/674; 707/823
(58) Field of Classification Search .................. None
See application file for complete search history.

(56) References Cited

U.S. PATENT DOCUMENTS

| | | |
|---|---|---|
| 5,262,956 A | 11/1993 | DeLeeuw |
| 5,481,701 A | 1/1996 | Chambers, IV |
| 5,592,669 A * | 1/1997 | Robinson et al. ............... 1/1 |
| 5,679,940 A | 10/1997 | Templeton et al. |
| 5,701,400 A | 12/1997 | Amado |
| 5,781,629 A | 7/1998 | Haber et al. |
| 5,781,722 A | 7/1998 | Buches, Jr. |
| 5,819,226 A | 10/1998 | Gopinathan et al. |
| 5,832,526 A | 11/1998 | Schuyler |
| 5,960,460 A | 9/1999 | Marasco et al. |
| 5,978,475 A | 11/1999 | Schneier et al. |
| 5,991,778 A | 11/1999 | Starek et al. |
| 6,026,397 A | 2/2000 | Sheppard et al. |
| 6,049,621 A | 4/2000 | Jain et al. |
| 6,058,193 A | 5/2000 | Cordery et al. |
| 6,064,810 A | 5/2000 | Raad et al. |
| 6,065,119 A | 5/2000 | Sandford, II et al. |
| 6,069,563 A | 5/2000 | Kadner et al. |
| 6,070,174 A | 5/2000 | Starek et al. |
| 6,091,835 A | 7/2000 | Smithies et al. |
| 6,119,103 A | 9/2000 | Basch et al. |
| 6,134,532 A | 10/2000 | Lazarus et al. |
| 6,157,707 A | 12/2000 | Baulier et al. |

(Continued)

FOREIGN PATENT DOCUMENTS

EP 0669032 11/1997

(Continued)

OTHER PUBLICATIONS

Forensic Analysis by Brian Carrier (Carrier) (Published by Addison-Wesley Professional, Mar. 2005) selected pp. 136-137, 140-143, 147-148, 160, 166, 169, 172-174, 181 and 191.*

(Continued)

*Primary Examiner* — Neveen Abel Jalil
*Assistant Examiner* — Kevin Young
(74) *Attorney, Agent, or Firm* — Allen, Dyer, Doppelt, Milbrath & Gilchrist, P.A.

(57) ABSTRACT

To recover deleted files in a data store, candidate blocks of the data store may be identified and, for each of the candidate blocks, a probability that the candidate block contains a directory entry may be determined. Directory entry metadata for candidate blocks that have a determined probability that is greater than a predetermined probability threshold may then be extracted.

42 Claims, 13 Drawing Sheets

U.S. PATENT DOCUMENTS

| | | | |
|---|---|---|---|
| 6,173,291 | B1 | 1/2001 | Jenevein |
| 6,263,349 | B1 | 7/2001 | Anderson |
| 6,279,010 | B1 | 8/2001 | Anderson |
| 6,314,437 | B1 | 11/2001 | Starek et al. |
| 6,345,283 | B1 | 2/2002 | Anderson |
| 6,636,873 | B1 | 10/2003 | Carini et al. |
| 6,711,699 | B1 | 3/2004 | Kanevsky et al. |
| 6,718,466 | B1 | 4/2004 | Duwe et al. |
| 6,792,545 | B2 | 9/2004 | McCreight et al. |
| 6,993,661 | B1 | 1/2006 | Garfinkel |
| 7,168,000 | B2 | 1/2007 | Stone-Kaplan et al. |
| 7,234,078 | B2 * | 6/2007 | Hida et al. ............. 714/15 |
| 7,630,955 | B2 * | 12/2009 | Byrd et al. ............. 1/1 |
| 2003/0041281 | A1 | 2/2003 | Nestor |
| 2003/0208689 | A1 | 11/2003 | Garza |
| 2006/0047920 | A1 * | 3/2006 | Moore et al. ............. 711/154 |
| 2007/0085710 | A1 | 4/2007 | Bousquet et al. |
| 2007/0085711 | A1 | 4/2007 | Bousquet et al. |
| 2007/0139231 | A1 | 6/2007 | Wallia et al. |
| 2007/0174367 | A1 * | 7/2007 | Shapiro ............. 707/205 |
| 2007/0276829 | A1 * | 11/2007 | Wang et al. ............. 707/7 |

FOREIGN PATENT DOCUMENTS

| | | |
|---|---|---|
| EP | 0893763 | 1/1999 |
| EP | 1050833 | 11/2000 |
| EP | 0782112 | 10/2006 |

OTHER PUBLICATIONS

Computer Forensics [online] SC/Info Security News Magazine, vol. 11, No. 4, Apr. 21, 2000, 4 pages.

Holley, James O., "Computer Forensics in the New Millennium" [online] SC/Info Security News Magazine, vol. 10, No. 9, Sep. 1, 1999, pp. 46-52.

"Content Based Search" [online] ADF Solutions, Inc. [retrieved on Apr. 8, 2008] Retrieved via the Internet: <http://www.adfsolutions.com/cbs.php>, 2 pages.

"Forensic Triage Solutions" [online] ADF Solutions, Inc. [retrieved on Apr. 8, 2008] Retrieved via the Internet: <http://www.adfsolutions.com/>, 2 pages.

"Guidance Software—EnCase Computer Forensics Software FastBloc Hardware and Training" [online] Guidance Software, Inc. [retrieved Apr. 8, 2002] Retrieved from the Internet: <http://www.guidancesoftware.com/html/index.html>, 2 pages.

"How Encase Works" [online] Guidance Software, Inc. [retrieved Apr. 8, 2002] Retrieved from the Internet: <http://www.guidancesoftware.com/html/how_encase_works.html>, 7 pages.

"Introduction to SSL" [online] Netscape Communications Corporation, Oct. 9, 1998 [retrieved May 19, 2004] Retrieved from the Internet: <http://developer.netscape.com/docs/manuals/security/sslin/contents.htm>, 12 pages.

"Microsoft Extensible Firmware Initiative FAT32 File System Specification—FAT: General Overview of On-Disk Format," Hardware White Paper, Designing Hardware for Microsoft® Operating Systems, Microsoft Corporation, Version 1.03, Dec. 6, 2000, 34 pages.

"PREMIO Computer's Windows NT 4.0 Troubleshooting Guide" [online] PREMIO Computer, Inc., Sep. 7, 1999 [retrieved Sep. 14, 2004] Retrieved from the Internet: <http://support.premiopc.com/faqs/nt40.htm>, 5 pages.

"Product Sheet: Triage-ID Triage Tool with Image Search for First Responders & Investigators" [online] ADF Solutions, Inc. [retrieved on Apr. 8, 2008] Retrieved via the Internet: <http://www.adfsolutions.com/ps/Triage-ID%20PS.pdf>, 2 pages.

"Product Sheet: Triage-Lab Case Qualification Tool for Investigators & Forensic Examiners" [online] ADF Solutions, Inc. [retrieved on Apr. 8, 2008] Retrieved via the Internet: <http://www.adfsolutions.com/ps/Triage-Lab%20PS.pdf>, 2 pages.

"SearchPak and SML" [online] ADF Solutions, Inc. [retrieved on Apr. 8, 2008] Retrieved via the Internet: <http://www.adfsolutions.com/searchpak.php>, 2 pages.

"SystemSafe w/SystemRestore Technology—Online Backup Solutions" [online] NetMass Incorporated, Mar. 2000 [retrieved Sep. 13, 2004] Retrieved from the Internet: <http://systemrestore.com>, <http://web.archive.org/collections/web/advanced.html>, 5 pages.

"Triage-ID Triage Tool with Image Search for First Responders & Investigators: A MUST HAVE TOOL for child exploitation, financial crimes, parole, probation and other cases." [online] ADF Solutions, Inc. [retrieved on Apr. 8, 2008] Retrieved via the Internet: <http://www.adfsolutions.com/triageid.php>, 2 pages.

"Triage-Lab Case Qualification Tool for Investigators & Forensic Examiners: A MUST HAVE TOOL for drive images analysis." [online] ADF Solutions, Inc. [retrieved on Apr. 8, 2008] Retrieved via the Internet: <http://www.adfsolutions.com/triagelab.php>, 2 pages.

"Workstation NT—Recovery Tips for Windows NT Workstation" [online] May 31, 1999 [retrieved Sep. 13, 2004] Retrieved from the Internet: <http://personal.cfw.com/-tkpritlutils/recovery.html>, 4 pages.

Briody, Dan, "IT Managers Weigh Legal Issues" [online] InfoWorld, 21, 36, 69, Sep. 1999 [retrieved Dec. 17, 2000] Retrieved from the Internet: <http://dialogweb.com/cgi/dwclient?dwcommand+DWEBPRINT%202>, 6 pages.

Castell, S., "The Legal Admissibility of Computer Generated Evidence Towards 'Legally Reliable' Information and Communications Technology (IACT)" [online] Computer Law and Security Report, vol. 5, No. 2, pp. 2-8, Jul.-Aug. 1989 [retrieved Dec. 17, 2000] Retrieved from the Internet: <http://dialogweb.com/cgi/dwclient?dwcommand+DWEBPRINT%202>, 8 pages.

Cobb, Michael, "Security Solutions (Question and Answer)" [online] e-Business Advisor, vol. 16, No. 5, p. 50 (5), May 1998 [retrieved Dec. 17, 2000] Retrieved from the Internet: <http://dialogweb.com/cgi/dwclient?dwcommand+DWEBPRINT%202>, 8 pages.

Goodwin, Bill, "Cybercrime-An Inside Job" [online] Computer Weekly, 16, Aug. 31, 2000 [retrieved Dec. 17, 2000] Retrieved from the Internet: <http://dialogweb.com/cgi/dwclient?dwcommand+DWEBPRINT%202>, 3 pages.

Hosmer, et al., "Advancing Crime Scene Computer Forensic Techniques" [online] Proceedings of the 1998 Investigation and Forensic Science Technologies Nov. 3-4, 1998, Proceedings of SPIE—The International Society for Optical Engineering, vol. 3576, pp. 24-23, 1999 [retrieved Dec. 17, 2000] Retrieved from the Internet: <http://dialogweb.com/cgi/dwclient?dwcommand+DWEBPRINT%202>, 11 pages.

Jackson, William, "When It Comes to Web Site Vandalism, Attackers Target Microsoft Software" [online] Government Computer News, 19, 31 39, Oct. 23, 2000 [retrieved Dec. 17, 2000] Retrieved from the Internet: <http://dialogweb.com/cgi/dwclient?dwcommand+DWEBPRINT%202>, 3 pages.

Murray, Bill, "Army Debuts IT Crime Unit" [online] Government Computer News, 19, 20, 48, Jul. 24, 2000 [retrieved Dec. 17, 2000] Retrieved from the Internet: <http://dialogweb.com/cgi/dwclient?dwcommand+DWEBPRINT%202>, 3 pages.

Musthaler, Linda, "Keeping a Data Trail is the Best Defense (IS Professionals Need to Keep Data Evidence to Guard Against Potential Computer Investigators) (Speaking in LANguage)" [online] Network World, vol. 14, No. 35, p. 41, Sep. 1, 1997 [retrieved Dec. 17, 2000] Retrieved from the Internet: <http://dialogweb.com/cgi/dwclient?dwcommand+DWEBPRINT%202>, 2 page.

Radcliff, Deborah, "Crime in the 21st Century: The New Field of Computer Forensics is Keeping Security Experts on the Trail of Cybercriminals" [online] InfoWorld, 20, 50, 65 (1), Dec. 14, 1998 [retrieved Dec. 17, 2000] Retrieved from the Internet: <http://dialogweb.com/cgi/dwclient?dwcommand+DWEBPRINT%202>, 4 pages.

Santo, Brian, "'Sherlock Holmes of Software' Bridges Technical and Legal Gulf in Cracking IP-Theft Cases—Software Forensics Expert Takes a Byte Out of Crime" [online] Electronics Engineering Times, No. 987, p. 16, 1998 [retrieved Dec. 17, 2000] Retrieved from the Internet: <http://dialogweb.com/cgi/dwclient?dwcommand+DWEBPRINT%202>, 5 pages.

Slabodkin, Gregory, "AF Computer Forensics Lab Nabs Criminals, Byte by Byte," [online] Government News, vol. 17, No. 25, p. 1(1), Aug. 10, 1998 [retrieved Dec. 17, 2000] Retrieved from the Internet: <http://dialogweb.com/cgi/dwclient?dwcommand+DWEBPRINT%202>, 3 pages.

Sommer, Peter, "Intrusion Detection System as Evidence" [online] Computer Networks, vol. 13, No. 23-24, pp. 2477-2487, Dec. 14, 1999, [retrieved Dec. 17, 2000] Retrieved from the Internet: <http://dialogweb.com/cgi/dwclient?dwcommand+DWEBPRINT%202>, 12 pages.

Sommer, Peter, "Investigating Cyberspace (National Criminal Intelligence Service)" [online] Computer Weekly, 24, Jan. 27, 2000 [retrieved Dec. 17, 2000] Retrieved from the Internet: <http://dialogweb.com/cgi/dwclient?dwcommand+DWEBPRINT%202>, 5 pages.

Tadjer, Rivka, "Safeguard your IT assets—You Can Prosecute a Hacker, If You Have the Right Systems in Place," [online] Internetweek, No. 767, p. 28, May 31, 1999 [retrieved Dec. 17, 2000] Retrieved from the Internet: <http://dialogweb.com/cgi/dwclient?dwcommand+DWEBPRINT%202>, 5 pages.

Welch, Mark, "A Forensic Computing Utility That Does It All" [online] The Forensic News Wire, Blue Line Magazine, Nov. 1999 [retrieved Apr. 8, 2002] Retrieved from the Internet: <http://www.guidancesoftware.com/news/blue_line1.html>, 5 pages.

Wright, Rob, "How to Avoid An Online Breach—The Right Tools to Fight Cybercrime—New Technology Helps E-Business Fight Online Security Breaches," [online] VARbusiness, No. 1623, p. 139, Nov. 13, 2000 [retrieved Dec. 17, 2000] Retrieved from the Internet: <http://dialogweb.com/cgi/dwclient?dwcommand+DWEBPRINT%202>, 5 pages.

* cited by examiner

| HEX | 56 | 61 | 6C | 75 | 65 | 45 | 72 | 72 | 6F | 74 | 04 | 00 | 00 | 00 | 6D | 65 | 6E | 28 | 00 | 00 | 23 | 00 | 00 | 52 | 8E | 00 |
|---|---|---|---|---|---|---|---|---|---|---|---|---|---|---|---|---|---|---|---|---|---|---|---|---|---|---|
| ASCII | V | a | l | u | e | E | r | r | o | t | . | . | . | . | m | e | n | ( | . | . | # | . | . | R | Ž | . |

| HEX | E5 | 45 | 4E | 52 | 54 | 46 | 20 | 58 | 53 | 4C | 20 | 18 | 1B | 20 | A0 | 7D | 33 | 00 | 33 | 00 | 32 | 7E | 6F | 33 | AA | 02 | 39 | 79 | 02 | 00 |
|---|---|---|---|---|---|---|---|---|---|---|---|---|---|---|---|---|---|---|---|---|---|---|---|---|---|---|---|---|---|---|
| ASCII | σ | E | N | R | T | F |   | X | S | L |   | . | . |   | . | } | 3 | . | 3 | . | 2 | ~ | o | 3 | ª | . | 9 | y | . | . |

1304

1308

TWO CANDIDATE DIRECTORY ENTRIES

FIG. 13

METHODS AND SYSTEMS FOR DATA RECOVERY

CROSS-REFERENCE TO RELATED APPLICATION

This application claims priority to and the benefit of, and incorporates herein by reference in its entirety, U.S. Provisional Patent Application No. 60/911,664, which was filed on Apr. 13, 2007.

TECHNICAL FIELD

The present invention relates, in various embodiments, to methods and systems for recovering directory and file data on a data store.

BACKGROUND

In a File Allocation Table ("FAT") file system each directory is implemented as a list of blocks, where each block includes 32 contiguous bytes. Each 32-byte block is referred to as a directory entry. The directory entries typically contain metadata about, and a pointer to, a file or directory that is in that directory. A directory entry begins and ends on a boundary that is a multiple of 32 bytes. An exemplary layout of a FAT directory entry 100 is shown in FIG. 1. As illustrated, the exemplary directory entry 100 includes a first character/allocation status byte 102, bytes 104 identifying characters 2-11 of the name of a file that is stored on a data store and that is referenced by the directory entry 100, an attribute byte 106, a reserved byte 108, bytes 110 identifying the creation time of the file referenced by the directory entry 100, bytes 112 identifying the last time the file was accessed, bytes 114 identifying the upper storage address for the file stored in the data store, bytes 116 identifying the last time the file was written to, bytes 118 identifying the lower storage address for the file stored in the data store, and bytes 120 identifying the size of the file. Each of these fields provides some metadata describing the file or directory.

When, for example, a file or directory is deleted, a disk is formatted, or other write event occurs, directory entries may be abandoned or lost, from the point of view of the FAT file system. For purposes of forensic analysis of a data store, however, directory entries hold valuable file metadata and may even point to an intact or semi-intact file that has not yet been overwritten.

Many forensic and file recovery tools currently use a very basic approach to lost file recovery for FAT File Systems. The first common method is to narrow the location to search for possible directory entries. This approach leads to a low number of false positives, but has been proven to miss important data that is beyond the algorithm's scope. Another common method is to exhaustively search all unallocated areas of a disk for directory entries. Since it is very difficult to validate that a block is or is not a directory entry, this approach generates a high number of false positives. This approach will find all critical data, but analysis or recovery based on this data may be difficult or even impossible due to the high number of false positives.

There exists a need, therefore, for new and improved methods and systems of recovering directory and file data on a data store.

SUMMARY OF THE INVENTION

There are several common characteristics of files that may be examined to determine the likelihood that a particular block of a data store is a valid directory entry. Just because a block is missing one or more characteristics, it cannot be dismissed as a valid directory entry. However, blocks that are missing many or even all of these characteristics may be assumed to have a low probability of being a valid directory entry. Using these characteristics in a probabilistic technique, embodiments of the invention more accurately separate true directory entries from random data on the data store. This approach has a low number of false positives, while facilitating an appropriately thorough search through the entire data store.

In general, in one aspect, a method for recovering deleted files in a data store includes identifying candidate blocks of a data store. The candidate blocks may be, for example, blocks located in unallocated clusters, blocks located in unused portions of allocated clusters, or both. The identified candidates may be identified from an analysis of one or more File Allocation Tables, or using other information.

The method also includes determining for each of the candidate blocks a probability that the candidate block contains a valid directory entry. This probability may be in the form of a percentage, or other value. The probability may be determined from an analysis of each candidate block and/or from an analysis of multiple candidate blocks together. In various embodiments, the probability is determined by any, some combination, or all of testing a reserved byte in a candidate block, testing an attribute byte in a candidate block, testing temporal data in a candidate block, testing a file name in a candidate block, and/or testing for contiguous groups of candidate blocks that are likely to be valid directory entries (e.g., for contiguous groups of candidate blocks that have an initial probability that is greater than a predetermined threshold). Other tests may be included as well or instead.

In some embodiments, initial probabilities are assigned to candidate blocks in a cluster by testing a reserved byte, testing an attribute byte, testing temporal data, and/or testing a file name. The determined probabilities are increased from initial probabilities for the contiguous candidate blocks having initial probabilities greater than a predetermined initial probability threshold. Thus, in some such embodiments, after initial probabilities are assigned, a determination is made of whether there are contiguous groups of candidate blocks with high initial probabilities, and the probabilities of those candidate blocks are increased from their already relatively high initial values. The size of the contiguous group may be a factor in determining how much to increase the probability.

The method also includes extracting directory entry metadata for candidate blocks that have a determined probability of being a valid directory entry that is greater than a predetermined probability threshold. Such a predetermined threshold may be manually configured or may be automatically adjustable based on the data. The metadata may include such information as filename, attributes, times, location, and size. The metadata may be extracted, and further processed, to determine whether it meets particular criteria. For example, the content of a deleted file may be recovered using file information in the extracted metadata and a timeline may be constructed using temporal information in the extracted metadata.

In general, in another aspect, a method for determining whether candidate blocks of a data store are likely to contain valid directory entries includes identifying candidate blocks of a data store, and assigning initial probabilities to candidate blocks by testing portions of each block to determine whether such portions meet criteria associated with a directory entry. The method also includes assigning a final probability that is higher than the initial probability to each candidate block in a contiguous group of candidate blocks that each have high initial probabilities. In addition, the method includes reporting candidate blocks having a final probability greater than a predetermined threshold as a list of blocks that are likely to contain a valid directory entry.

The candidate blocks may include blocks located in unallocated clusters, blocks located in unused portions of allocated clusters, or both, as well as possibly other blocks selected manually or by another method. Assigning the initial probability may include any one or combination of testing a reserved byte in a candidate block, testing an attribute byte in a candidate block, testing temporal data in a candidate block, and testing a file name in the candidate block, as well as other tests. The method may also include extracting directory entry metadata for candidate blocks on the list, recovering the content of a deleted file using file information in the extracted metadata, and/or constructing a timeline using temporal information in the extracted metadata.

In general, in another aspect, a system for recovering deleted files in a data store includes a candidate block identification module for identifying candidate blocks of a data store, a determination module for determining for each of the candidate blocks a probability that the candidate block contains a valid directory entry, and an extraction module for extracting directory entry metadata for candidate blocks that have a determined probability that is greater than a predetermined probability threshold. Optionally, the system may also include a recovery module for recovering the content of a deleted file using file information in the extracted metadata, and/or a timeline module for constructing a timeline using temporal information in the extracted metadata. Such a system may implement any of the methods described herein.

The modules may be implemented as software modules running on a general purpose computer. In some embodiments, these modules are part of a shared library of routines originally written in the C++ programming language and compiled into executable form. In various embodiments, such a library is scalable, extensible, modular, and cross-platform.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 13 is a block diagram depicting two exemplary candidate directory entries.

DESCRIPTION

In various embodiments, the present invention relates to methods and systems for recovering directory and file data on a data store. In general, in broad overview, a 32-byte block of data on a data store may be examined to determine the likelihood that it is a FAT directory entry. If the block does not have one, two, or even a few of the characteristics described further below, it may not be advisable to decide that it is not a valid directory entry. However, blocks that are missing many or even all of these characteristics may be assumed to have a low probability of being a valid directory entry. Using the characteristics in combination to determine the probability that a 32-byte block is a valid directory entry, embodiments of the invention more accurately separate actual directory entries from random data on the data store. Advantageously, this approach yields a lower number of false positives, while still maintaining a usefully thorough search of a data store.

A. CHARACTERISTICS OF DIRECTORY ENTRIES

First, a description of the characteristics of directory entries in a FAT file system is provided.

A. 1. The Reserved Bits of the Attribute Byte, and the Reserved Byte

Figure 1:
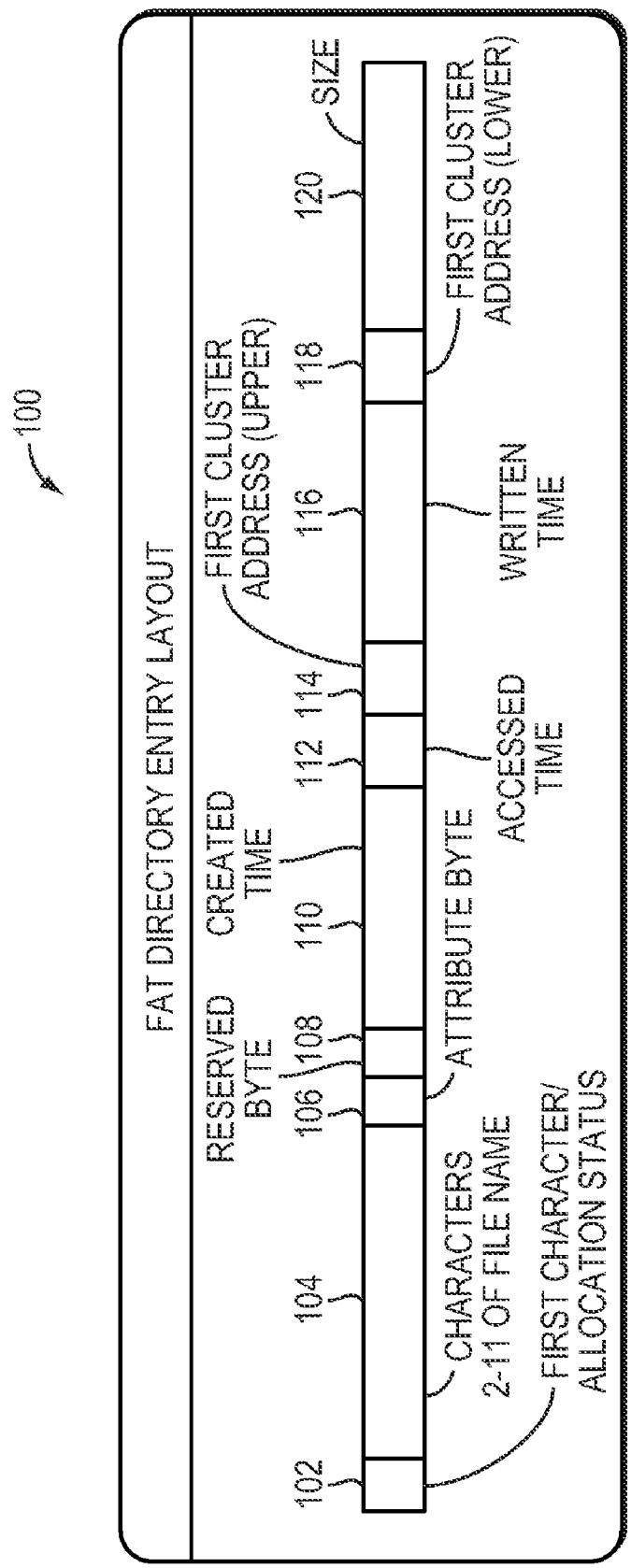
FIG. 1 is a block diagram of an exemplary FAT file system directory entry.

With reference to the exemplary 32-byte directory entry 100 depicted in FIG. 1, the upper two bits of the attribute byte 106 are marked as reserved. In a FAT file system, these bits are usually set to zero for valid directory entries. If these bits are set to one, it is less likely that the 32-byte entry 100 is a valid directory entry.

The two middle bits of the reserved byte 108 in a directory entry are typically used to indicate whether the filename and extension (stored in bytes 104) should be printed as uppercase or lowercase. If any bits, other than the two middle bits, in the reserved byte 108 are set to one, it is less likely that the 32-byte entry is a valid directory entry.

A. 2. Time Consistency and Time Range

Temporal information, for example the creation time of the file (identified by bytes 110 in the exemplary directory entry 100), the last time the file was accessed (identified by bytes 112 in the exemplary directory entry 100), and the last time the file was written to (identified by bytes 116 in the exemplary directory entry 100), may be useful when determining whether or not a block of data is a valid directory entry. In one embodiment, the consistency and range of these times contribute to the overall probability. However, since very little time information is required by the FAT specification, and several implementations of FAT file systems appear to ignore this requirement altogether, lack of time information (e.g., all zeroes in bytes 110, 112, and/or 116) does not automatically mean that the data is not a valid directory entry.

Figure 2:
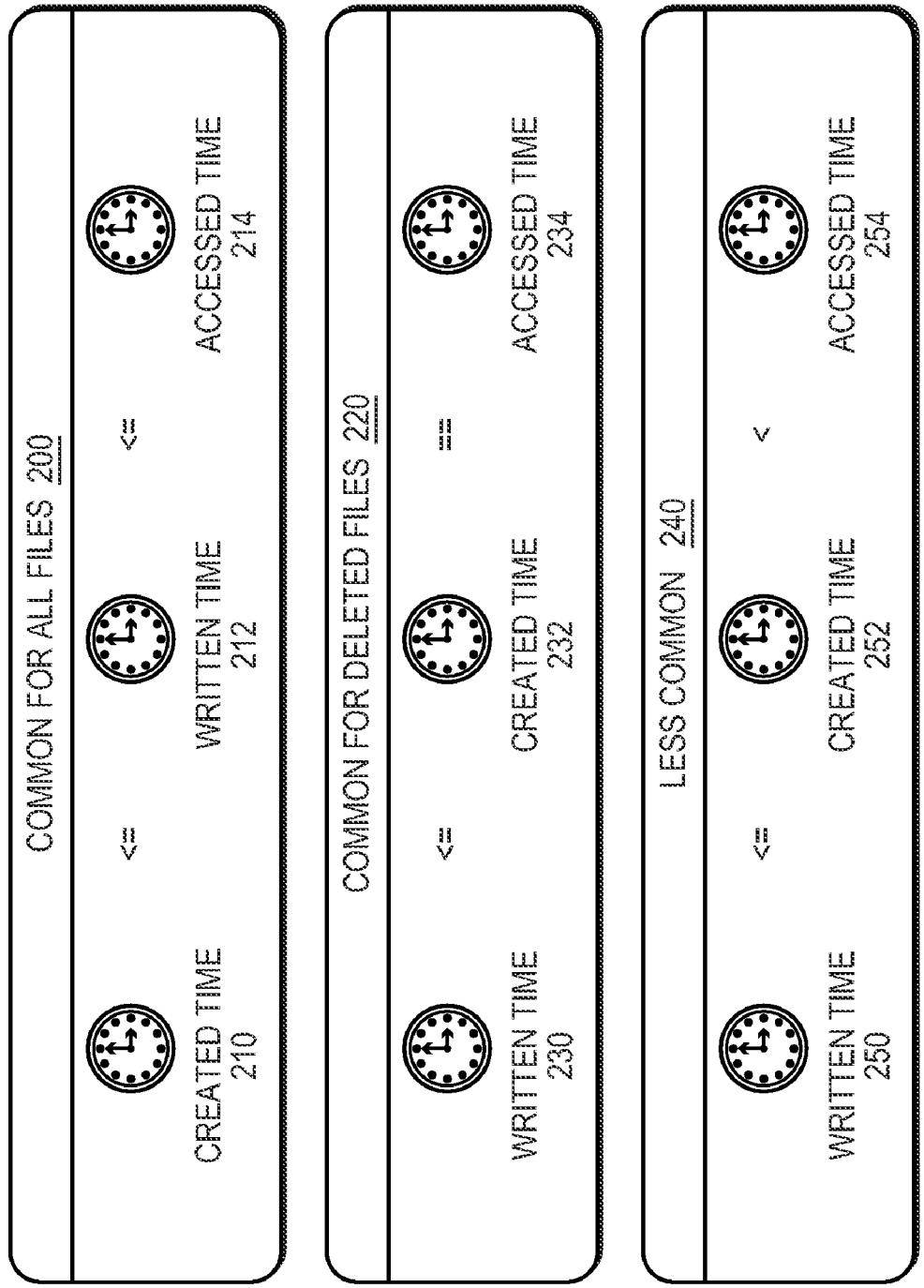
FIG. 2 is a demonstrative depiction of common FAT directly entry file time patterns.

Time coherency may be determined using the three common patterns 200, 220, 240 depicted in FIG. 2. In one embodiment, if one or more of the created time, written time, or accessed time is zero, that time is omitted from the comparison. However, the coherency and values of the remaining times may be more heavily weighted.

With reference first to pattern 200, for all files (including deleted files) in a FAT file system, it is common for the time that the file was created 210 to be less than or equal to the time that the file was last written 212, and for the time that the file was last written 212 to be less than or equal to the time that the file was last accessed 214. With reference to pattern 220, it has been observed that, for deleted files in the FAT file system, it is common for the time that the file was last written 230 to be less than or equal to the time that the file was created 232, and for the time that the file was created 232 to be equal to the time that the file was last accessed 234. In addition, with reference to pattern 240, it has also been observed that, for deleted files in the FAT file system, it is less common but still possible for the time that the file was last written 250 to be less than or equal to the time that the file was created 252, and for the time that the file was created 252 to be less than the time that the file was last accessed 254. Patterns 220 and 240 have been empirically observed for deleted files in the FAT file system. It is possible that such patterns 220, 240 arise because, for example, upon deletion of a file in a FAT file system, one or more of the bytes 110, 112, and 116 are overwritten with new data such that the values stored in the bytes 110, 112, and 116 no longer identify the actual creation time of the file, the actual time the file was last accessed, and the actual time the file was last written to, respectively.

If the time values do not fall into one of the patterns 200, 220, 240, it is likely that some of the data in the 32-byte block is corrupt or otherwise not useful, and the 32-byte block is less likely to be a valid directory entry. Thus, in various embodiments, the relationship between temporal data values may be used to increase or decrease the probability that a 32-byte block is a valid directory entry.

As further described below, the effect of these temporal values on the probability that a 32-byte block is a valid directory entry may be weighted, for example linearly. Dates stored in the bytes 110, 112, and 116 that are in the future are less likely to be valid than dates that are in the past. Moreover, the further in the future a date is, the less likely it is to be valid. In one embodiment, the cumulative probability of the three dates stored in the bytes 110, 112, and 116 being valid, combined with a weighting factor assigned by a time coherency test, is used in determining the overall probability that the 32-byte block is a valid directory entry. In various embodiments, the temporal values are compared with expected ranges of values therefor to increase or decrease the probability that a 32-byte block is a valid directory entry.

One embodiment of how a probability may be adjusted based on temporal data is described further below with respect to FIGS. 8-11.

A. 3. Cluster and Block Analysis

Figure 3:
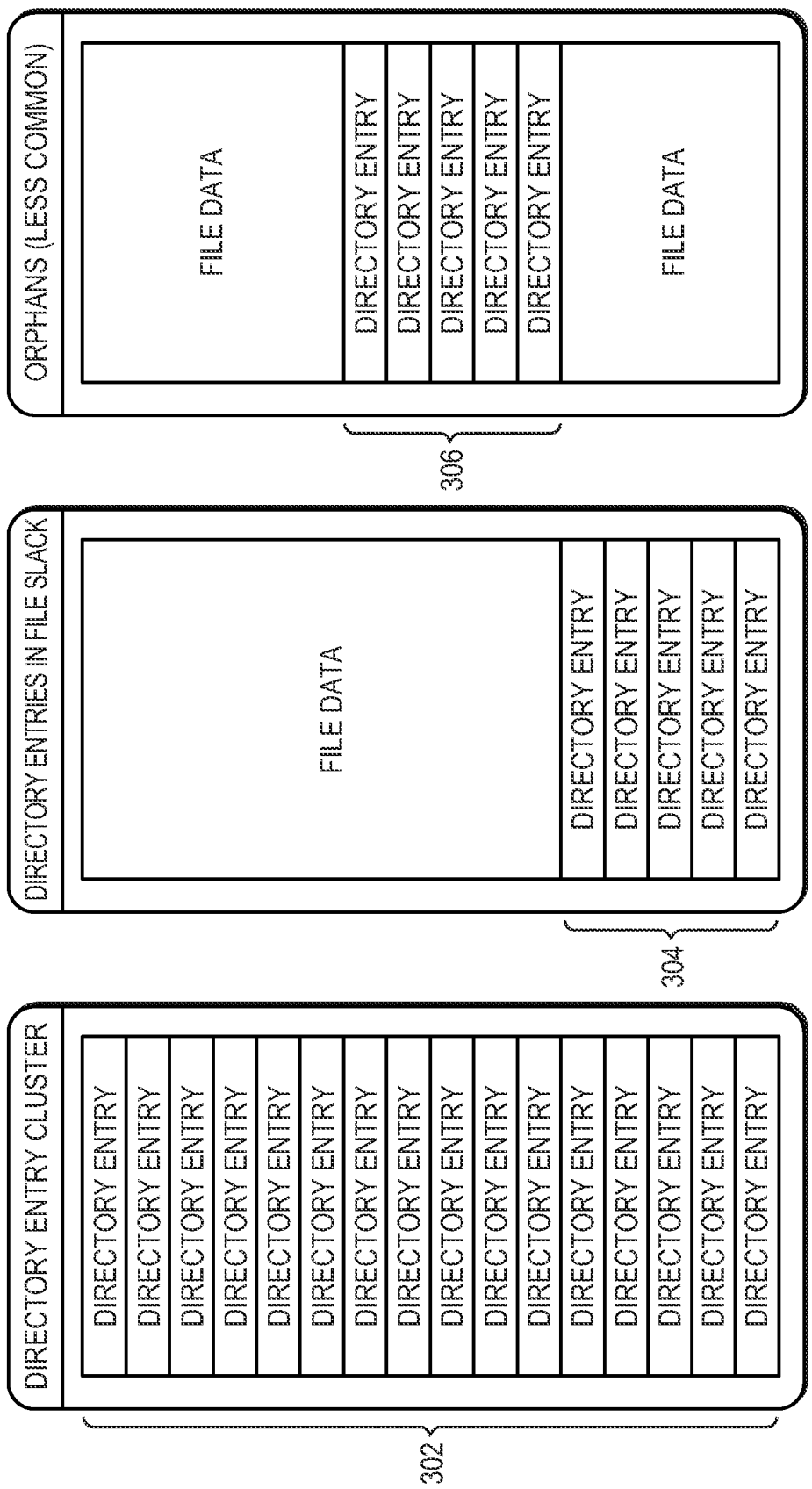
FIG. 3 is a demonstrative block diagram depicting the manner in which directory entries may form clusters.

Since, in a FAT file system, directory entries are stored in clusters, it is more common to find groups of contiguous directory entries, such as groups 302, 304, and 306 depicted in FIG. 3. Thus, in accordance with embodiments of the invention, if many consecutive 32-byte blocks on the data store are individually determined to have a high probability of being a valid directory entry, they are all collectively given a higher probability of being a valid directory entry.

In addition, in a FAT file system, the first cluster assigned to a directory has two standard directory entries in the first 64 bytes. The first directory entry is for the current directory and it is assigned a short filename, in bytes 104, of ".". The second entry is for the parent directory and it is assigned a short filename, in bytes 104, of "..". Clusters that contain these two standard directory entries in the first 64 bytes are much more likely to contain more valid directory entries.

A. 4. Common Filename Characteristics

In most implementations of the FAT file system, when a file is deleted, its directory entry's first byte 102 is overwritten with the value 0xE5. Thus, if a 32-byte block of data has a value of 0xE5 in its first byte, it is more likely that it is a directory entry.

In addition, since the original implementations of FAT file systems only supported filenames with 8 characters plus a 3 character extension, later versions of FAT file systems had to truncate file names to fit into the short filename field 104 in the directory entry 100. This was and is typically done by truncating the main part of the filename after the $6^{th}$ character, adding a tilde (~) character for the $7^{th}$ character, and adding a unique number for the $8^{th}$ character. Thus, if a block of data has a tilde character in the $7^{th}$ character of its short filename field 104 and a number (0-9) in the $8^{th}$ character of its short filename field 104, it is more likely that it is a directory entry.

A. 5. "Lost" Directory Entries

For easy reference, data storage devices are usually logically split into equally sized blocks called clusters. An unallocated cluster is a logical block of the data store that is not claimed by any active file in the file system. This means that the entire cluster does not contain file data or metadata for an active file. With reference again to FIG. 3, sometimes a file may have a size that is not a multiple of the cluster size. In such case, a contiguous group of bytes 304 at the end of a cluster, referred to as the file slack, does not contain data for the file to which the cluster is assigned. Rather, the file slack 304 contains previously-written data. Occasionally, data from a previous file may be found in the middle 306 of a cluster with data from other files before and after it. This usually happens from reformatting the data store with a different cluster size.

Figure 4:
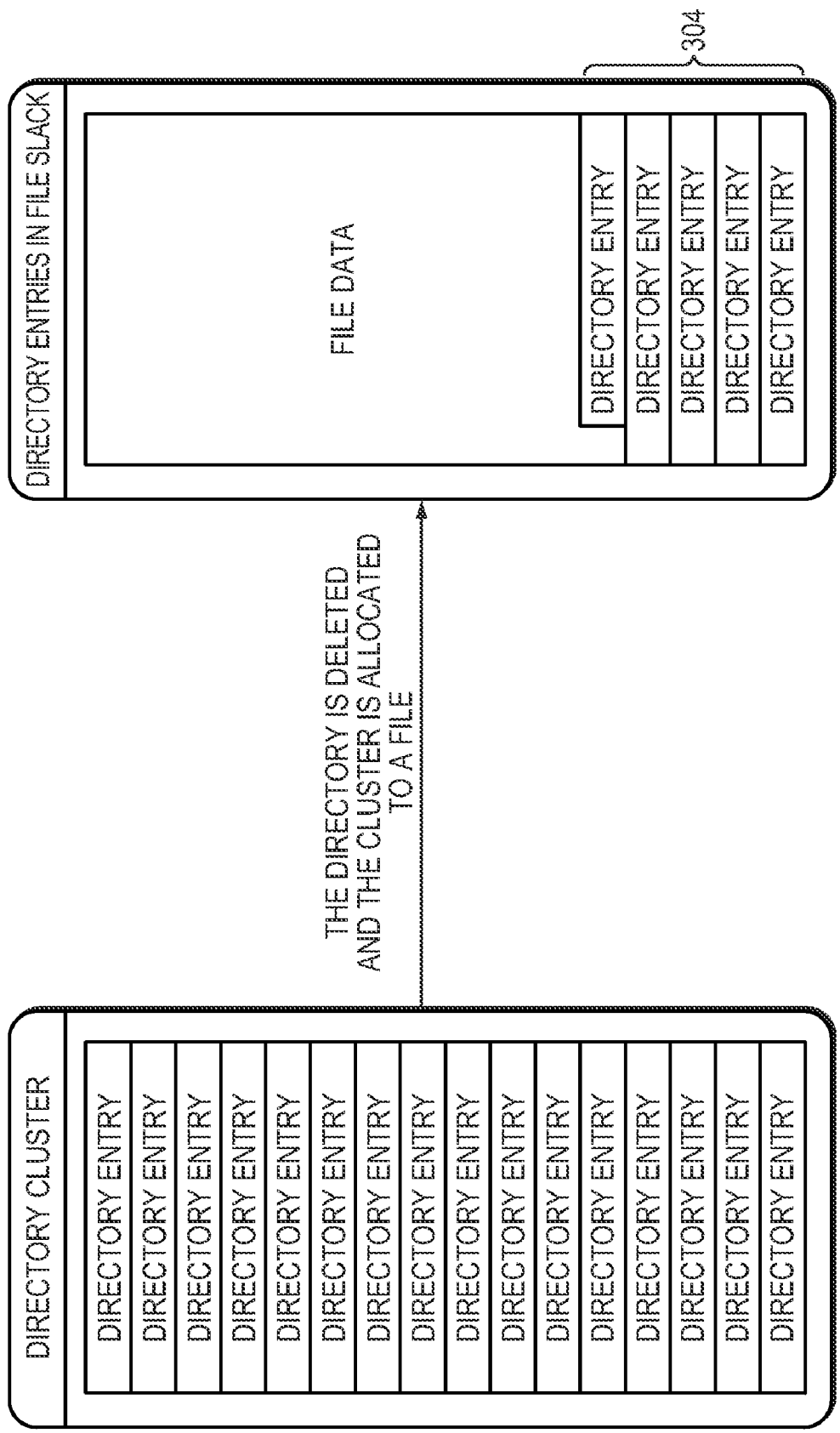
FIG. 4 is a demonstrative depiction of how directory entries may end up in file slack.

FIG. 4 illustrates how directory entries may end up in file slack 304. This usually happens when a cluster is initially allocated to a directory. Subsequently, the directory is deleted and the cluster is later assigned to a new file. If that file does not have a size that is a multiple of the cluster size, there may be recoverable directory entries in the file slack 304.

B. DATA RECOVERY METHODS

Figure 5:
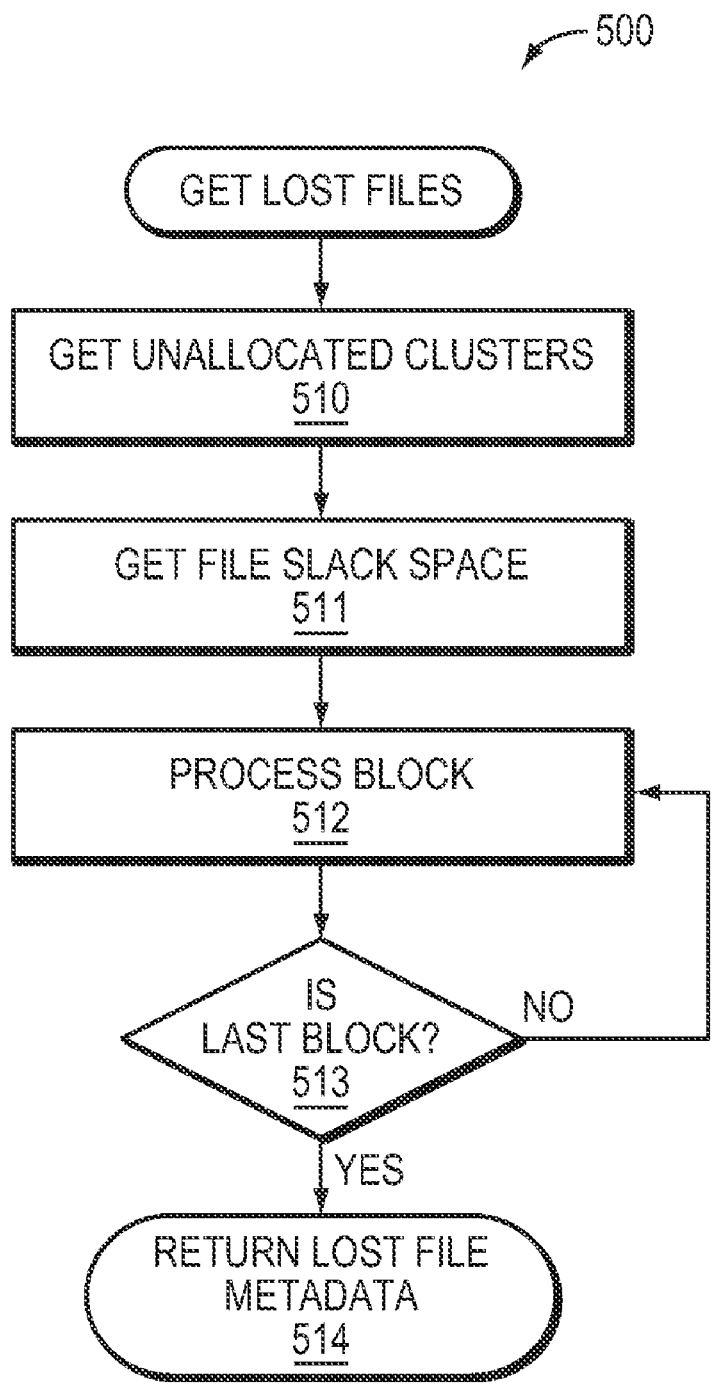
FIG. 5 is a flow chart of a process for finding lost files according to an embodiment of the invention.

As used herein, an "unallocated block" refers to a contiguous number of bytes that may be in unallocated clusters or in unused portions of allocated clusters (i.e., in file slack). Referring to FIG. 5, in one embodiment, a file recovery system examines every unallocated block of data to determine whether such unallocated blocks contain directory entries. A flow chart 500 describing a process implemented by the system is shown. The system begins by finding all unallocated clusters in the data store (step 510). In one embodiment, the system does so by determining all of the active files on the data store, and by determining what clusters have been allocated to those active files. Any remaining clusters are then treated as unallocated clusters. The system then finds all file slack on the data store (step 511). In one embodiment, for each active file found in step 510, the system locates the final cluster that has been allocated to that file. The system then determines where the actual file data ends in that final cluster. Any data after the end of the actual file data in that final cluster is treated as file slack. Each unallocated block of data (e.g., all unallocated clusters and file slack) is then processed (step 512), with a probabilistic determination as described below, until the last block is processed (i.e., a "Yes" answer is provided at step 513). When the last block is processed, metadata from blocks that were determined, at step 512, to be valid directory entries may be extracted and communicated (step 514). The metadata communicated may include such information as the name of a file, the times that the file was created, last written to, and last accessed, the time that the file or a portion thereof was deleted, the location in the data store where the file was or is stored, and the size of the file.

In certain embodiments, the content of a deleted file is then recovered using that extracted metadata. For example, the system may be able to recover a file's data (or portions thereof) by using the cluster address stored in bytes 114 and 118, the file size stored in bytes 120, and a file allocation table of the FAT file system. In one embodiment, the system begins by testing to see if the starting cluster, stored in bytes 114 and 118 of the directory entry 100, has been allocated to a new file. If it has not been reallocated, data recovery may be possible. In one embodiment, the system then attempts to extract a contiguous block of data that is equal to the file's size 120, beginning from the starting cluster stored in bytes 114 and 118 of the directory entry 100. If any of the clusters in that contiguous block belong to an allocated file, they may be skipped and the next available cluster used instead.

In addition, a timeline may be constructed for a file by using the temporal information in the extracted metadata. For example, a timeline showing when the file was created, last written to, last accessed, and/or deleted may be constructed.

Figure 6:
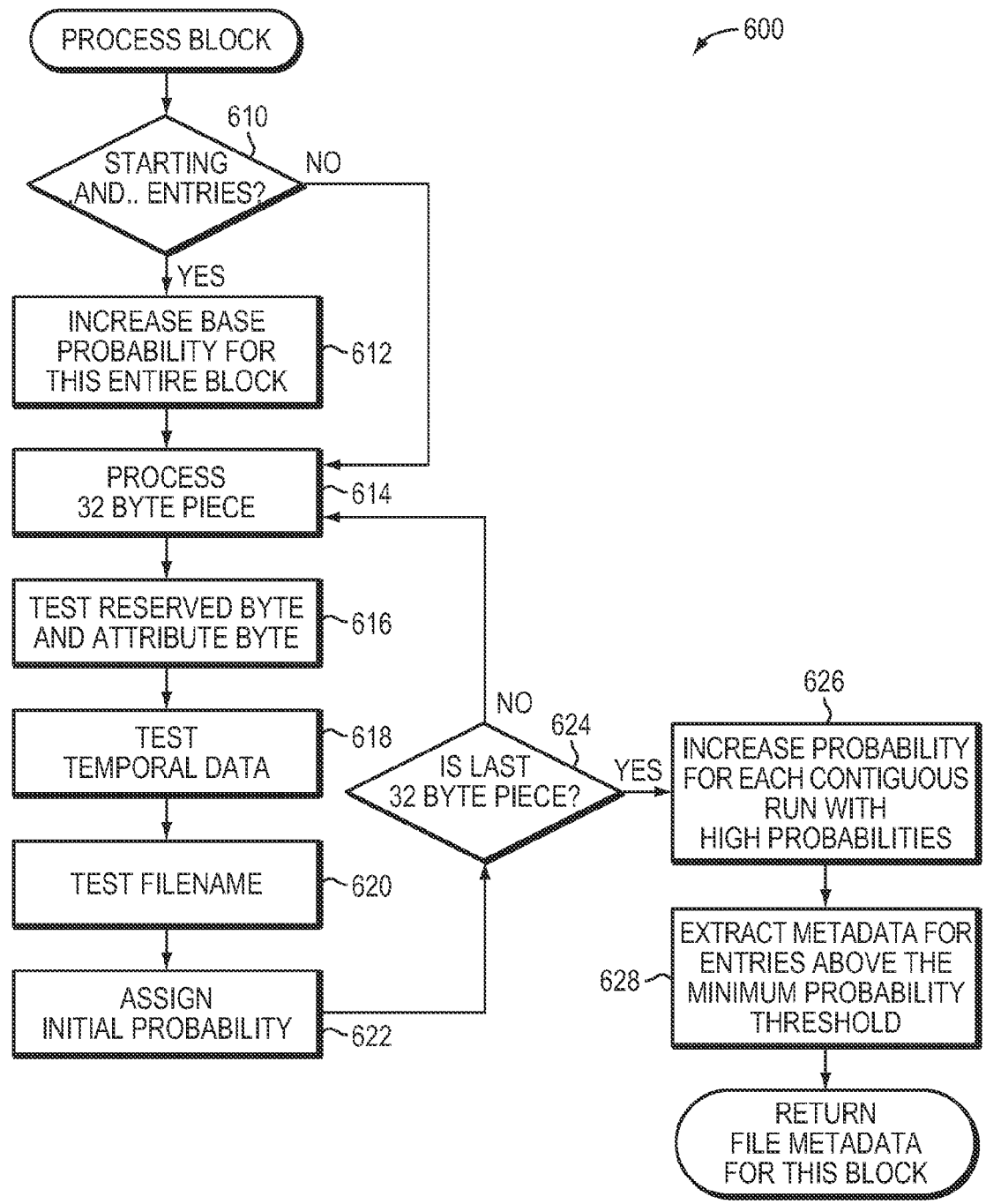
FIG. 6 is a flow chart demonstrating a process for finding lost files according to an embodiment of the invention.

FIG. 6 depicts one embodiment of step 512 from FIG. 5 in greater detail. More specifically, FIG. 6 depicts one embodiment of a method 600 for processing an unallocated block of data to determine the probability that the block contains valid directory entries. First, each 32-byte block in the unallocated block is assigned a neutral starting probability value. This starting value may be any value, so long as it is consistently applied. In one embodiment, the starting value is 50. As each characteristic of each 32-byte block is examined, the probability that that 32-byte block is a valid directory entry may be increased, decreased, or left the same. In one embodiment, the amount that the probability is altered depends on the characteristic and other calculated factors.

As shown, in one embodiment, a first step 610 is to determine whether the first and second 32-byte blocks in the overall unallocated block (e.g., the unallocated cluster or file slack) has a "." entry and a ".." entry, respectively, in their short filename fields 104. If so, this will increase the probability that the unallocated block includes valid directory entries (step 612), and the neutral starting probability value of each 32-byte block in the overall unallocated block may be increased. Next, each 32-byte block of the overall unallocated block is examined (step 614). Initially, a "sanity check" may be performed to ensure that the 32-byte block meets the minimum requirements for a directory entry. Such a sanity check may include, but is not limited to: i) checking for invalid characters in the filename field 104; ii) checking for invalid combinations in the attribute byte 106; iii) checking for non-existent temporal values (e.g., February 31) in, for example, the bytes 110 identifying the creation time, the bytes 112 identifying the time of last access, and the bytes 116 identifying the last write time; and iv) checking the bytes 120 for impossible file sizes (e.g., a 2 GB file on a 1 GB data store). This initial sanity check may determine whether a probabilistic analysis is to be performed. For example, in some embodiments, if one or more of the sanity checks determines that the data is invalid, the probability analysis for that particular 32-byte block is skipped, and a probability of 0 is assigned thereto. In other cases, the initial probability value is lowered for each sanity check that detects inappropriate data.

Following the initial sanity check, the reserved byte 108 and the attribute byte 106 are tested (step 616), as described above in section A. 1. If, for example, the reserved byte 108 data and/or the attribute byte 106 data are consistent with typical values for a valid directory entry, the probability that the 32-byte block being tested is a valid directory entry may be increased.

Temporal data in the 32-byte block may be tested at step 618. An implementation of this is further described below with respect to FIGS. 8-11. If the temporal data is consistent with values for a valid directory entry, the probability that the 32-byte block being tested is a valid directory entry may be increased. The first character 102 data and short filename 104 data in the 32-byte block may also be tested (step 620), as described above in section A. 4. If the first character 102 data and/or short filename 104 data is consistent with values for a valid directory entry, the probability that the 32-byte block being tested is a valid directory entry may be increased.

As a result of these tests, an initial probability value for the 32-byte block under examination may be assigned at step 622. If there are more 32-byte blocks to be tested, (i.e., a "No" answer is provided at step 624), the remaining 32-byte blocks may be processed by iterating through steps 614, 616, 618, 620, and 622. After the last 32-byte block is processed (i.e., a "Yes" answer is provided at step 624), a determination may be made at step 626 as to whether there are runs of contiguous 32-byte blocks that have high probabilities (i.e., probabilities greater than a predetermined initial probability threshold) of being valid directory entries. In one embodiment, if there are a number of adjacent 32-byte blocks having high probabilities, the probability that each of those 32-byte blocks is a valid directory entry is increased even further. This is because it is likely that directory entries will be next to each other.

In one embodiment, the system then proceeds to extract metadata at step 628 for all of the 32-byte blocks whose probability of being a valid directory entry is above a minimum threshold. The minimum threshold may, for example, be set manually. The system may also identify and report, for example in the form of a list, those 32-byte blocks.

Figure 7:
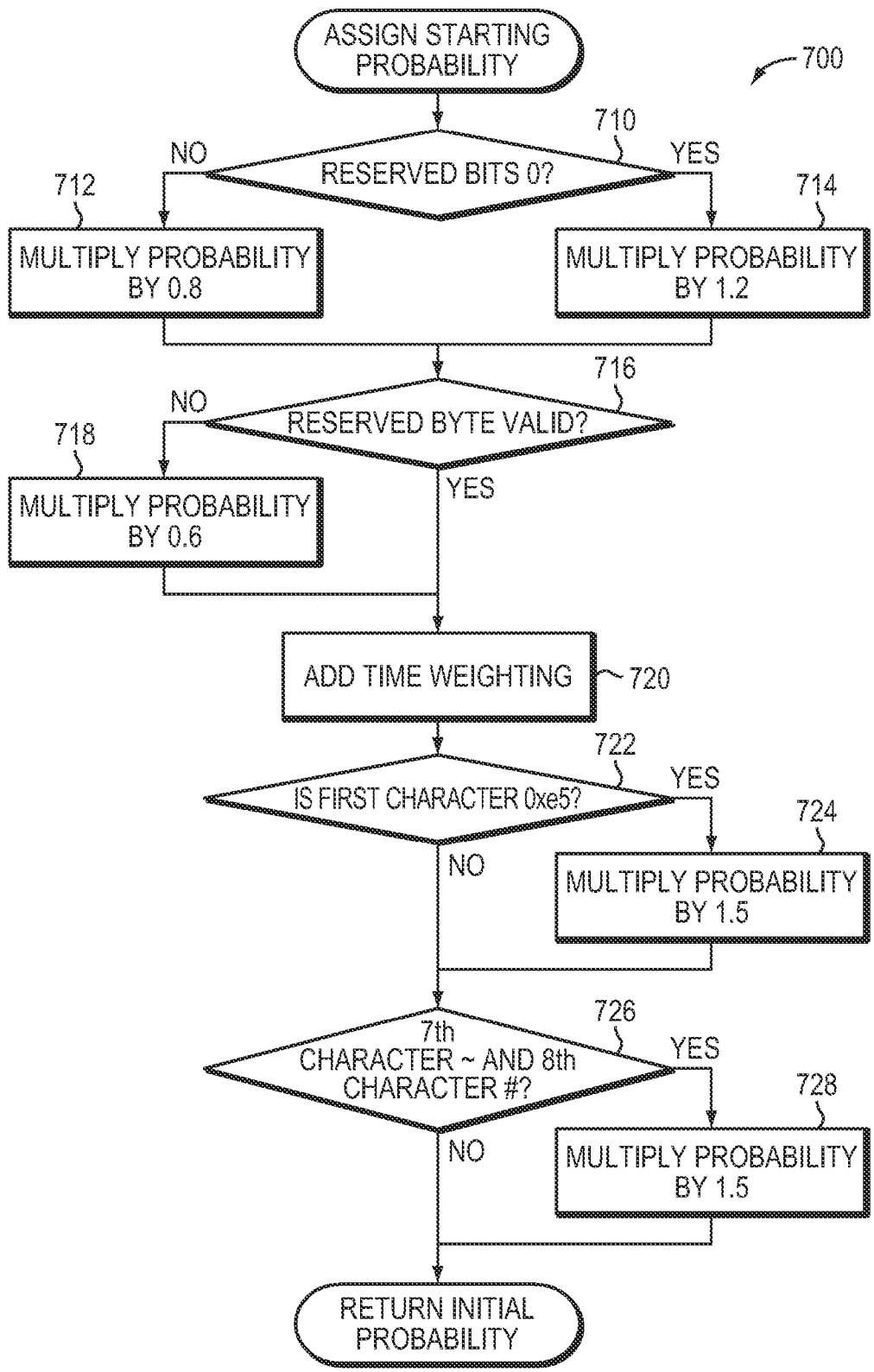
FIG. 7 is a flow chart demonstrating initial probability determination according to an embodiment of the invention.

FIG. 7 depicts one embodiment of steps 616, 618, 620, and 622 from FIG. 6 in greater detail. More specifically, FIG. 7 depicts one embodiment of a method 700 for assigning an initial probability value to a 32-byte block. As earlier stated, each 32-byte block begins with a neutral starting probability value. This value may be 50, for example, or may be any other number. In some cases, as described above with reference to steps 610 and 612 of FIG. 6, the neutral starting probability value of each 32-byte block is increased if the short filename fields 104 of the first and second 32-byte blocks of the overall unallocated block indicate that the unallocated block is likely to include valid directory entries.

As described with reference to step 616 of FIG. 6, the upper two bits of the attribute byte 106 of the 32-byte block (also known as the reserved bits) may be checked (step 710). If the reserved bits are not 0, the probability that the 32-byte block being examined is a valid directory entry may be multiplied by 0.8; if the reserved bits are 0, the probability may be multiplied by 1.2. In other words, in this embodiment, the probability that the 32-byte block is a valid directory entry is increased or decreased by 20% based on the content of the reserved bits in the attribute byte 106. Next, as also described with reference to step 616 of FIG. 6, the reserved byte 108 is checked for validity (step 716). If the reserved byte is not valid, the probability that the 32-byte block being tested is a valid directory entry may be multiplied by 0.6 (i.e., decreased by 40%).

Time weighting may then be performed at step 720 (referred to as step 618 in FIG. 6), for example using the techniques described below with respect to FIGS. 8-11.

Then, as described with reference to step 620 of FIG. 6, the first character stored in byte 102 of the 32-byte block is checked to determine whether it has a value of "0xe5" (step 722). If so, the probability for the 32-byte block may be multiplied by 1.5 (step 724). The short filename field 104 may also be checked to determine whether its 7$^{th}$ character is a tilde (~) and its 8$^{th}$ character is a number (step 726). If so, the probability for the 32-byte block may again be multiplied by 1.5 (step 728).

The result is a value representing an initial probability that the 32-byte block being tested is a valid directory entry. That value is assigned, at step 622 of FIG. 6, as the initial probability of the 32-byte block being tested.

FIGS. 8-11 depict one embodiment of step 618 from FIG. 6 and step 720 from FIG. 7 in greater detail. More specifically, FIGS. 8-11 depict a detailed flow chart that describes a process 800 for testing temporal data in the 32-byte block under examination and for applying a time value weighting portion to the initial probability calculation. In one embodiment, the process 800 sets a time value weight value as well as a time value bonus value. The weight value and the bonus value may be used to determine how much weight, and what probability, to assign to the temporal data.

Figure 8:
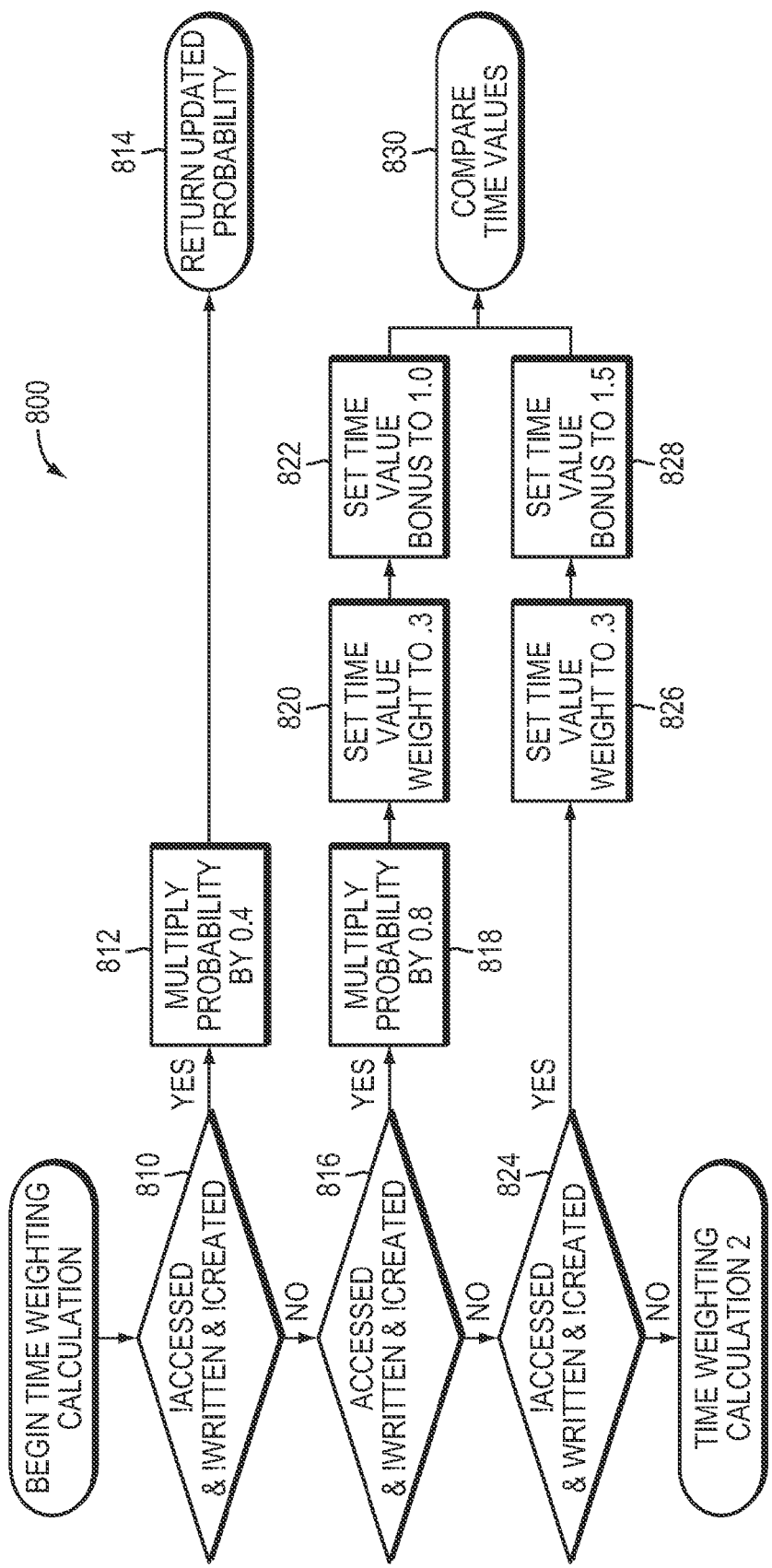
FIGS. 8-11 are a flow chart of a process for time weighting according to an embodiment of the invention.
Figure 9:
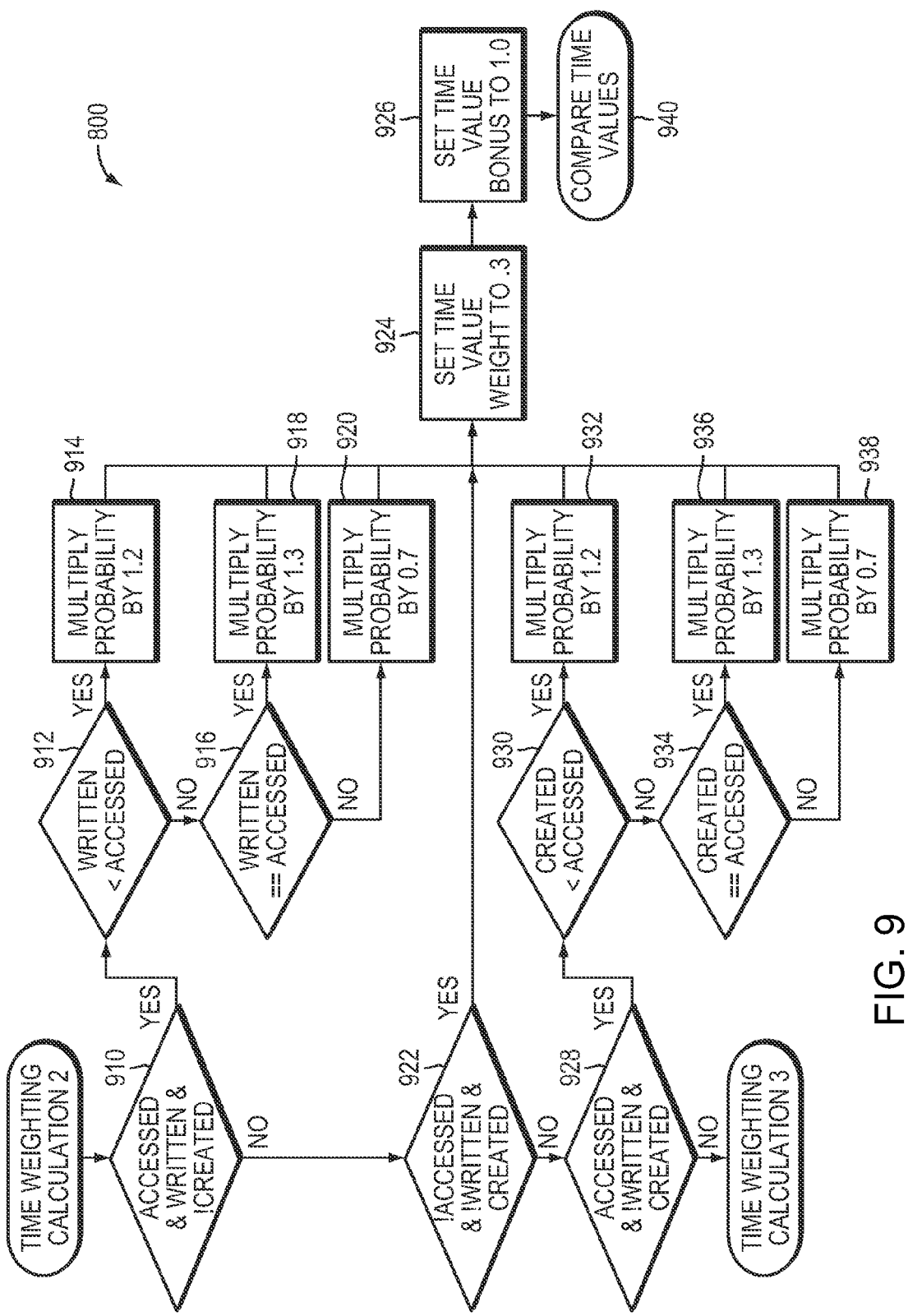
Figure 10:
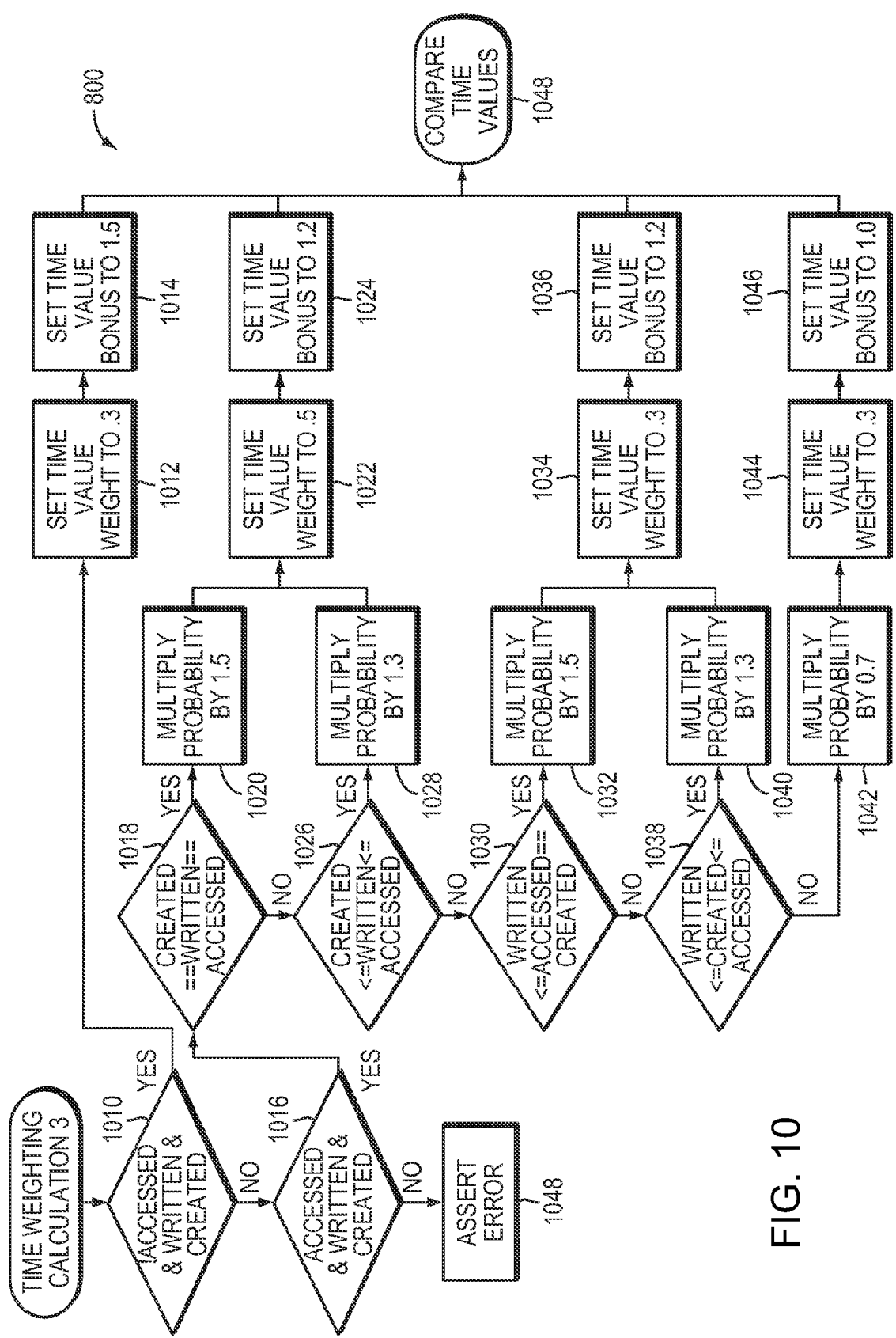

Referring first to FIG. 8-10, first a determination is made (i.e., at steps 810, 816, 824, 910, 922, 928, 1010, and/or 1016) about the validity of the temporal values stored in the bytes 110, 112, and 116 (where temporal values for the time a file was created, the time the file was last accessed, and the time the file was last written to, respectively, would be stored in a valid directory entry 100). The validity check may test the values in various ways, depending on the particular implementation. For example, a valid temporal value may be any value that is not 0. As another example, a valid temporal value may be any value that is not zero, and is not too far (e.g., more than 100 years) in the future. In other embodiments, a check for "nonsense" values, such as a repeated character, or values out of range in some other way may be used. Based on the determination of which temporal values have valid data, and the relationship of that data, the probability that the 32-byte block is a valid directory entry may be adjusted and/or other variables may be set or modified. Those other variables may be used in later probability adjustments. For example, in the implementation depicted in FIGS. 8-10, the determination of the validity of the temporal values and the relationship between the temporal values may set or adjust a time value weight value and a time value bonus value. These values may then be used to further adjust the probability that the 32-byte block being tested is a valid directory entry, as described further with respect to FIG. 11.

For example, with reference first to FIG. 8, if there is no valid accessed time value stored in bytes 112, no valid written time value stored in bytes 116, and no valid created time value stored in bytes 110 (i.e., a "Yes" answer is provided to step 810), then the probability that the 32-byte block being tested is a valid directory entry may be multiplied by 0.4 (step 812), and the temporal analysis concludes (step 814). If, however, there is a valid accessed time value stored in bytes 112, but no valid written time value stored in bytes 116 and no valid created time value stored in bytes 110 (i.e., a "No" answer is provided to step 810 and a "Yes" answer is provided to step 816), then the probability that the 32-byte block being tested is a valid directory entry may be multiplied by 0.8 (step 818), the time value weight value may be set to 0.3 (step 820), the time value bonus value may be set to 1.0 (step 822), and a process for comparing time values may be undertaken (step 830, which is described further with respect to FIG. 11). If, however, there is a valid written time value stored in bytes 116, but no valid accessed time value stored in bytes 112 and no valid created time value stored in bytes 110 (i.e., a "No" answer is provided to steps 810 and 816, and a "Yes" answer is provided to step 824), then the time value weight value may be set to 0.3 (step 826), the time value bonus may be set to 1.5 (step 828), and the process for comparing time values may be undertaken (step 830, which, as stated, is described further with respect to FIG. 11).

Referring to FIG. 9, if there is a valid accessed time value stored in bytes 112 and a valid written time value stored in bytes 116, but not a valid created time value stored in bytes 110 (i.e., a "No" answer is provided to steps 810, 816, and 824, and a "Yes" answer is provided to step 910), then a determination may be made at steps 912 and 916 about the relationship between the written time value and the accessed time value. More specifically, if the written time value is less than the accessed time value (i.e., a "Yes" answer is provided at step 912), then the probability that the 32-byte block being tested is a valid directory entry may be multiplied by 1.2 (step 914). If, however, the written time value and the accessed time value are the same (i.e., a "No" answer is provided at step 912 and a "Yes" answer is provided at step 916), then the probability that the 32-byte block being tested is a valid directory entry may be multiplied by 1.3 (step 918). If, however, the written time value is greater than the accessed time value (i.e., a "No" answer is provided at steps 912 and 916), a combination that is not consistent with the patterns 200, 220, and 240 depicted in FIG. 2, then the probability that the 32-byte block being tested is a valid directory entry may be multiplied by 0.7 (step 920). In any case, where a "Yes" answer is provided to step 910, the time value weight value may be set to 0.3 (step 924) and the time value bonus may be set to 1.0 (step 926). The process for comparing time values may then be undertaken (step 940, which is described further with respect to FIG. 11).

Figure 11:
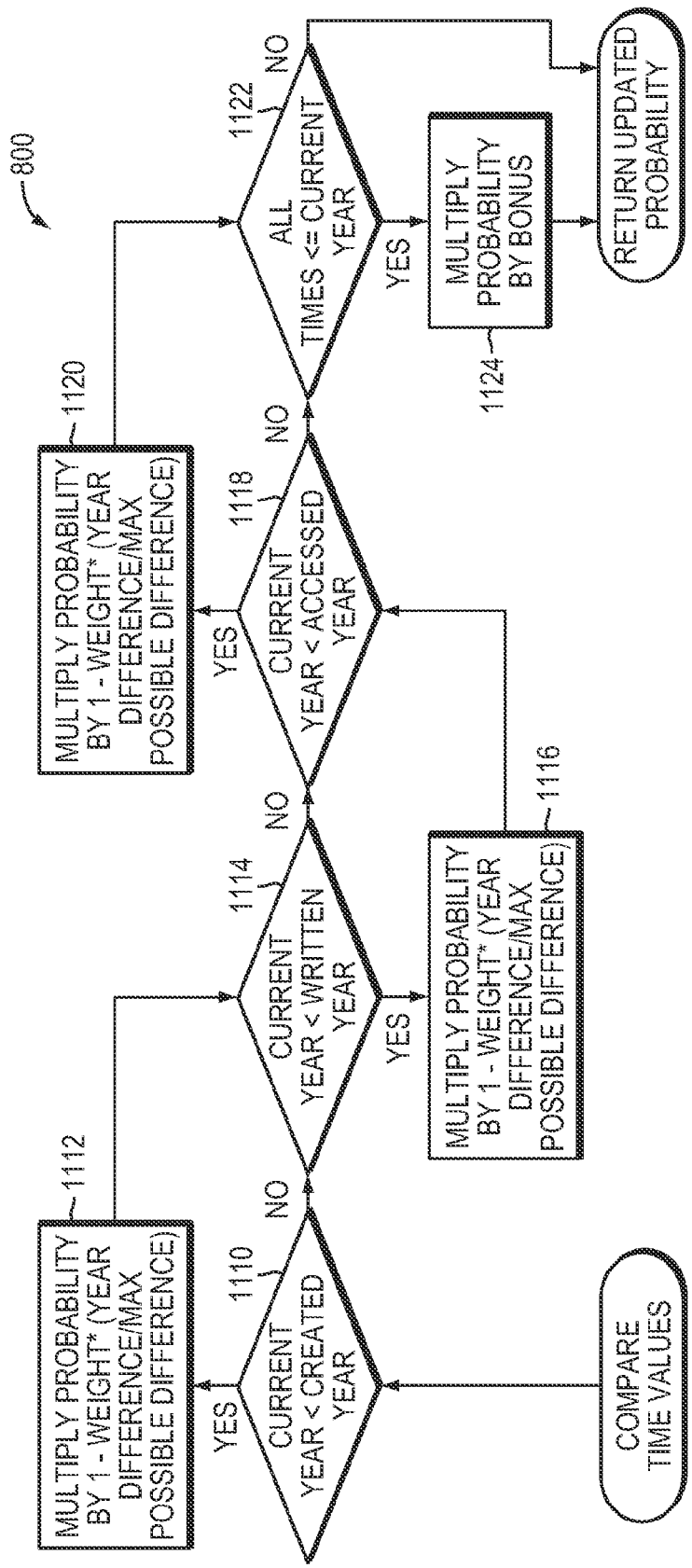

If there is a valid created time value stored in bytes 110, but not a valid accessed time value stored in bytes 112 and not a valid written time value stored in bytes 116 (i.e., a "No" answer is provided to steps 810, 816, 824, and 910, and a "Yes" answer is provided to step 922), then the time value weight value may be set to 0.3 (step 924), the time value bonus value may be set to 1.0 (step 926), and the process for comparing time values may then be undertaken (step 940, which, as stated, is described further with respect to FIG. 11).

If there is a valid accessed time value stored in bytes 112 and a valid created time value stored in bytes 110, but not a valid written time value stored in bytes 116 (i.e., a "No" answer is provided to steps 810, 816, 824, 910, and 922, and a "Yes" answer is provided to step 928), then the created time value and the accessed time value may be compared (steps 930 and 934). If the created time value is less than the accessed time value (i.e., a "Yes" answer is provided to step 930), then the probability that the 32-byte block being tested is a valid directory entry may be multiplied by 1.2 (step 932). If, however, the created time value is the same as the accessed time value (i.e., a "No" answer is provided to step 930 and a "Yes" answer is provided to step 934), then the probability that the 32-byte block being tested is a valid directory entry may be multiplied by 1.3 (step 936). If, however, the created time value is greater than the accessed time value (i.e., a "No" answer is provided to steps 930 and 934), a combination that is not consistent with the patterns 200, 220, and 240 depicted in FIG. 2, then the probability that the 32-byte block being tested is a valid directory entry may be multiplied by 0.7 (step 938). In any case, where a "Yes" answer is provided to step 928, the time value weight value may be set to 0.3 (step 924), the time value bonus value may be set to 1.0 (step 926), and the process for comparing time values may then be undertaken (step 940, which, as stated, is described further with respect to FIG. 11).

Referring to FIG. 10, if there is a valid written time value stored in bytes 116 and a valid created time value stored in bytes 110, but not a valid accessed time value stored in bytes 112 (i.e., a "No" answer is provided to steps 810, 816, 824, 910, 922, and 928, and a "Yes" answer is provided to step 1010), then the time value weight value may be set to 0.3 (step 1012), the time value bonus value may be set to 1.5 (step 1014), and the process for comparing time values may be undertaken (step 1048, which is described further with respect to FIG. 11).

If all three of the time values are valid, that is, there is a valid accessed time value stored in bytes 112, a valid written time value stored in bytes 116, and a valid created time value stored in bytes 110 (i.e., a "No" answer is provided to steps 810, 816, 824, 910, 922, and 1010, and a "Yes" answer is provided to step 1016), then the three time values may be compared (steps 1018, 1026, 1030, and 1038). If all three values are the same (i.e., a "Yes" answer is provided to step 1018), then the probability that the 32-byte block being tested is a valid directory entry may be multiplied by 1.5 (step 1020), the time value weight value may be set to 0.5 (step 1022), and the time value bonus value may be set to 1.2 (step 1024). If the created time value is less than or equal to the written time value, and the written time value is less than or equal to the accessed time value (i.e., a "No" answer is provided to step 1018 and "Yes" answer is provided to step 1026), then the probability that the 32-byte block being tested is a valid directory entry may be multiplied by 1.3 (step 1028), the time value weight value may be set to 0.5 (step 1022), and the time value bonus value may be set to 1.2 (step 1024). If the written time value is less than or equal to the accessed time value, and the accessed time value is equal to the created value (i.e., a "No" answer is provided to steps 1018 and 1026, and "Yes" answer is provided to step 1030), then the probability that the 32-byte block being tested is a valid directory entry may be multiplied by 1.5 (step 1032), the time value weight value may be set to 0.3 (step 1034), and the time value bonus value may be set to 1.2 (step 1036). If the written time value is less than or equal to the created time value, and the created time value is less than or equal to the accessed time value (i.e., a "No" answer is provided to steps 1018, 1026, and 1030, and "Yes" answer is provided to step 1038), then the probability that the 32-byte block being tested is a valid directory entry may be multiplied by 1.3 (step 1040), the time value weight value may be set to 0.3 (step 1034), and the time value bonus value may be set to 1.2 (step 1036). In all other cases (i.e., where a "No" answer is provided to steps 1018, 1026, 1030, and 1038), the probability that the 32-byte block being tested is a valid directory entry may be multiplied by 0.7 (step 1042), the time value weight value may be set to 0.3 (step 1044), and the time value bonus value may be set to 1.0 (step 1046). In any case, where a "Yes" answer is provided to step 1016, the process for comparing time values may be undertaken (step 1048, which, as stated, is described further with respect to FIG. 11).

FIG. 11 depicts one embodiment of step 830 from FIG. 8, step 940 from FIG. 9, and step 1048 from FIG. 10 in greater detail. More specifically, FIG. 11 depicts one embodiment of a method for further analyzing time values and for further adjusting the initial probability that the 32-byte block being tested is a valid directory entry. In particular, if the current year is less than the year of the created time value stored in bytes 110 (i.e., a "Yes" answer is provided at step 1110), then at step 1112 the probability that the 32-byte block being tested is a valid directory entry may be multiplied by:

$$(1-(\text{weight}*(\text{Year Difference/Max Possible Difference})))\text{,}$$

where "weight" is the time value weight value previously set during a step in FIGS. 8-10;

Year Difference=(the year of the created time value)−(the current year); and

Max Possible Difference=2107−(the current year).

In addition, if the current year is less than the year of the written time value stored in bytes 116 (i.e., a "Yes" answer is provided at step 1114), then at step 1116 the probability that the 32-byte block being tested is a valid directory entry may be multiplied by:

$$(1-(\text{weight}*(\text{Year Difference/Max Possible Difference})))\text{,}$$

where "weight" is the time value weight value previously set during a step in FIGS. 8-10;

Year Difference=(the year of the written time value)−(the current year); and

Max Possible Difference=2107−(the current year).

In addition still, if the current year is less than the year of the accessed time value stored in bytes 112 (i.e., a "Yes" answer is provided at step 1118), then at step 1120 the probability that the 32-byte block being tested is a valid directory entry may be multiplied by:

$$(1-(\text{weight}*(\text{Year Difference/Max Possible Difference})))\text{,}$$

where "weight" is the time value weight value previously set during a step in FIGS. 8-10;

Year Difference=(the year of the accessed time value)−(the current year); and

Max Possible Difference=2107−(the current year).

If, however, the year of the created time value stored in bytes 110, the year of the written time value stored in bytes 116, and the year of the accessed time value stored in bytes 112 are all less than or equal to the current year (i.e., a "Yes" answer is provided at step 1122), then at step 1124 the probability that the 32-byte block being tested is a valid directory entry may be multiplied by the time value bonus value previously set during a step in FIGS. 8-10.

Accordingly, the probability that the 32-byte block being tested is a valid directory entry is adjusted at step 618 of FIG. 6 and step 720 of FIG. 7.

It should be noted that, in a FAT file system directory entry 100, the times stored in bytes 110, 112, and 116 typically have different levels of precision. More specifically, the time stored in bytes 110 (i.e., the time that the file was created) includes information for the month, day, year, hour, minute, second, and tenth of second that the file was created. The time stored in bytes 116 (i.e., the time that the file was last written to) includes information for the month, day, year, hour, minute, and second that the file was last written to. The time stored in bytes 112 (i.e., the time that the file was last accessed) includes, however, only information for the month, day, and year that the file was last accessed.

Accordingly, in one embodiment of the time comparisons described above with reference to FIGS. 8-11, the times in question are compared by considering the following information in the following order: year, then month, then day, then hour (if available), then minute (if available), and then second (if available). Tenths of seconds may be ignored as they only occur for the values stored in bytes 110 (i.e., the time that the file was created). Thus, in one embodiment, if an accessed time of 5/7/07 is stored in bytes 112 and a written time of 5/7/07 13:44:56 is stored in bytes 116, those two times are deemed equal when compared because all of the data available for both times (i.e., the year, month, and day) are equal.

C. DATA RECOVERY SYSTEM

Figure 12:
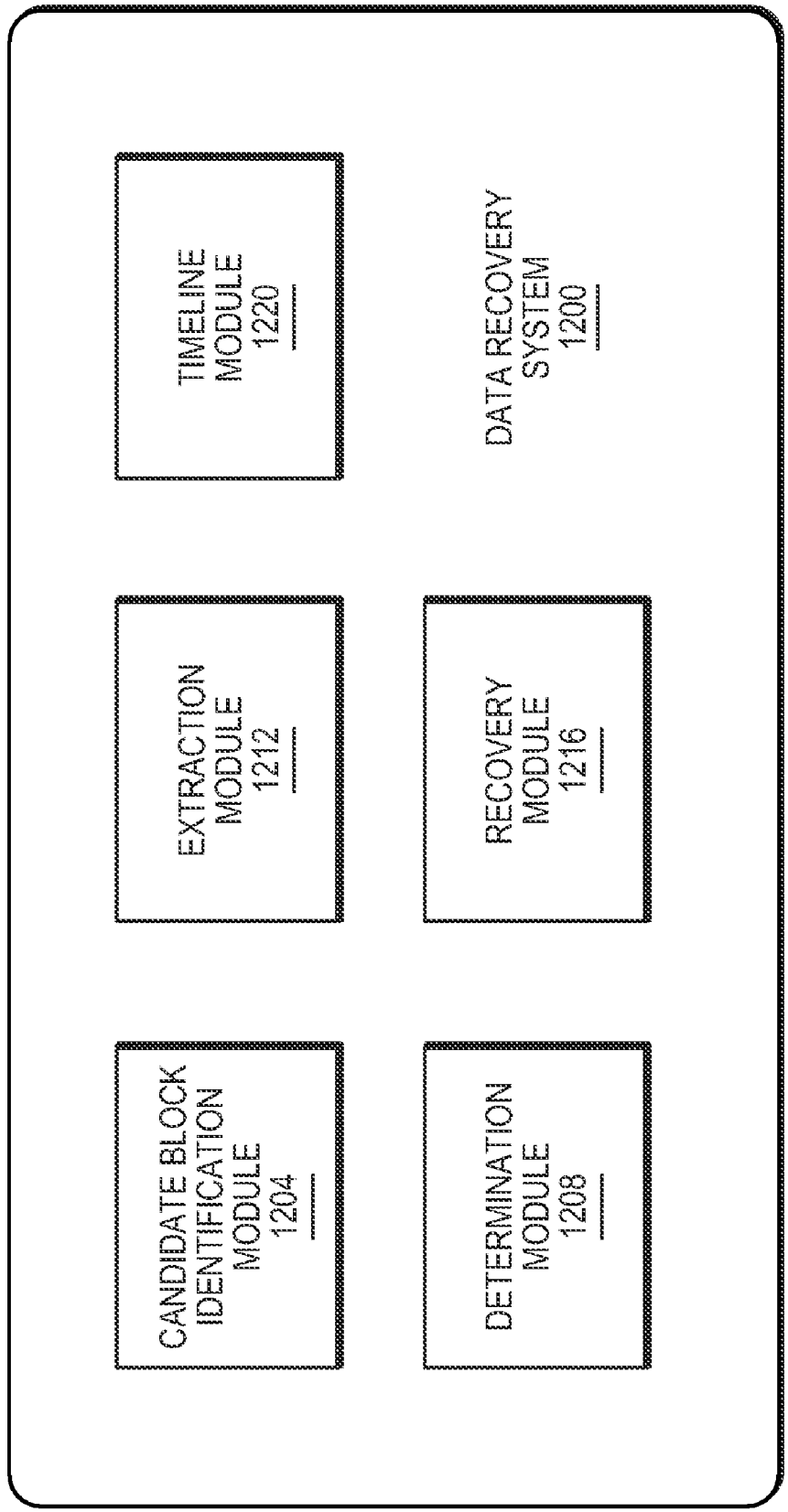
FIG. 12 is a block diagram of a system for recovering deleted files in a data store according to an embodiment of the invention.

FIG. 12 depicts an exemplary data recovery system 1200 for use in accordance with embodiments of the invention. As illustrated, the data recovery system 1200 may include a candidate block identification module 1204, a determination module 1208, an extraction module 1212, a recovery module 1216, and a timeline module 1220. The data recovery system 1200 may be any type of computing device (e.g., personal computer, Windows-based terminal, network computer, wireless device, information appliance, RISC Power PC, X-device, workstation, mini computer, main frame computer, personal digital assistant, handheld device, or other computing device) that is capable of interacting with a data store (not shown), as described herein. For example, the data recovery system 1200 may include a visual display device (e.g., a computer monitor), a data entry device (e.g., a keyboard), persistent and/or volatile storage (e.g., computer memory), a processor, and a mouse.

The candidate block identification module 1204 may analyze a data store to identify candidate blocks that could contain one or more directory entries, as described with reference to, for example, steps 510 and 511 of FIG. 5. For its part, the determination module 1208 may determine a probability for each candidate block, which represents the likelihood that the candidate block contains a valid directory entry. The determination module 1208 may analyze, for example, the reserved byte, the attribute byte, and/or a filename in a given candidate block and modify the probability that the candidate block contains a valid directory entry, as described with reference to FIGS. 6 and 7. The determination module 1208 may also analyze, amongst other items, temporal data in each candidate block, assign a time value weight value or a time value bonus value to each candidate block, and modify the probability that the candidate block contains a valid directory entry, as described with reference to FIGS. 8-11.

In one embodiment, if the resultant probability that the candidate block is a valid directory entry exceeds a threshold value, the extraction module 1212 extracts directory entry metadata from that candidate block, as described with reference to, for example, step 514 of FIG. 5. As previously described, the recovery module 1216 may then recover the content of a deleted file using file information in extracted metadata, and the timeline module 1220 may construct a timeline by using the temporal information in the extracted metadata.

The candidate block identification module 1204, determination module 1208, extraction module 1212, recovery module 1216, and timeline module 1220 may each be implemented as any software program and/or hardware device, for example as an application specific integrated circuit (ASIC) or field programmable gate array (FPGA), that is capable of providing the functionality described above. In addition, it will be understood by one having ordinary skill in the art that the illustrated modules 1204, 1208, 1212, 1216, 1220 are conceptual, rather than explicit, requirements. For example, two or more of the modules 1204, 1208, 1212, 1216, 1220 may be combined into a single module, such that the functions performed by the two or more modules, as described above, are in fact performed by the single module. In addition, it will be understood that any single one of the modules 1204, 1208, 1212, 1216, 1220 may be implemented as multiple modules, such that the functions performed by any single one of the modules 1204, 1208, 1212, 1216, 1220, as described above, are in fact performed by the multiple modules.

Moreover, the data recovery system 1200 may be modified in of a variety of manners without departing from the spirit and scope of the invention. For example, rather than being implemented on a single data recovery system 1200, any one or all of the modules 1204, 1208, 1212, 1216, 1220 may be implemented on one or more other computing devices (not shown) and communicate with the data recovery system 1200 directly or over a network (not shown). In addition, a data store analyzed by the system 1200 may be located either locally to, or remotely from, the data recovery system 1200. As such, the depiction of the system 1200 in FIG. 12 is non-limiting.

It should also be noted that embodiments of the present invention may be provided as one or more computer-readable programs embodied on or in one or more articles of manufacture. The article of manufacture may be a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

D. EXAMPLES

FIG. 13 depicts two 32-byte blocks of data 1304, 1308 that will be examined in the following examples. To make the examples clearer, the metadata in the blocks 1304, 1308 are first translated into a human readable form.

The metadata of the first potential directory entry 1304 is as follows:
Filename: ValueErr.ort
Attributes: 0x04 (System)
Reserved Byte: 0x00
Created Time: Nov. 05 13:40:00 2028
Accessed Time: Mar. 14 2000
Written Time: Oct. 18 00:00:00 1997
Starting Cluster: 0
Size: 9327104

The metadata of the second potential directory entry 1308 is as follows:
Filename: σENRTF.XSL
Attributes: 0x20 (Archive)
Reserved Byte: 0x18
Created Time: Nov. 29 20:01:00 2005
Accessed Time: Nov. 29 2005
Written Time: Nov. 15 15:49:36 2005
Starting Cluster: 682
Size: 162105

A probability calculation for the first potential directory entry 1304 is first given. Referring to FIG. 7, a starting probability of 50 is first assigned. The reserved bits of the attribute byte are then examined at step 710; because they are zero, the probability is multiplied by 1.2 at step 714, thereby increasing the probability to 60. The reserved byte is valid, as determined in step 716, so the probability is not modified. The time weighting calculation is then undertaken at step 720. More specifically, the accessed time, written time, and created time are analyzed as shown in FIGS. 8-11. All three times are available and valid, meaning that a "Yes" answer is provided at step 1016. The written time is less than the accessed time, which is less than the created time. This pattern matches none of the choices given in steps 1018, 1026, 1030, 1038. As a result, the probability is multiplied by 0.7 at step 1042, thereby decreasing the probability to 42. In addition, the time value weight value is set to 0.3 at step 1044 and the time value bonus value is set to 1.0 at step 1046.

Next, the time values are compared in FIG. 11. For the purposes of this example, it is assumed that the current year is 2007. At step 1110, it is determined that the current year, 2007, is less than the created year, 2028. As such, at step 1112, the probability is multiplied by 1−0.3×(2028−2007)/(2107−2007)=0.937, thereby decreasing the probability to 39. Because the current year is not less than the written year or the accessed year, a "No" answer is provided at steps 1114 and 1118. A "No" answer is also provided at step 1122 because the created year is greater than the current year. Accordingly, steps 1116, 1120, and 1124 are not performed.

Referring again to FIG. 7, the first character of the filename is checked at step 722. Because it is not 0xe5, the probability remains unchanged. Likewise the seventh and eighth characters of the filename are not "~" or a digit, respectively, so a "No" answer is provided at step 726. Thus, 39 is the initial probability, returned at the end of the method 700 in FIG. 7, that the block 1304 is a valid directory entry.

Now, the probability calculation for the second potential directory entry 1308 is given. Referring to FIG. 7, as was the case for the first potential directory entry 1304, a starting probability of 50 is assigned. The reserved bits of the attribute byte are examined at step 710; because they are zero, the probability is multiplied by 1.2 at step 714, thereby increasing the probability to 60. Because the reserved byte is valid, as determined at step 716, the probability is not modified. The time weighting calculation is then undertaken at step 720. More specifically, the accessed time, written time, and created time are analyzed as shown in FIGS. 8-11. As in the first example, all three times are available and valid, meaning that a "Yes" answer is provided at step 1016. Because the accessed time only contains data for a year, month, and day, and not also for an hour, minute, or second, the accessed time is compared to the written time and created time based only on year, month, and day data. The written time is clearly less than the accessed time. Because, however, the accessed time and created time have the same year, month, and day, they are deemed equal. As such, a "Yes" answer is provided at step 1030 and the probability is multiplied by 1.5 at step 1032, thereby increasing the probability to 90. In addition, the time value weight value is set to 0.3 at step 1034 and the time value bonus value is set to 1.2 at step 1036.

Next, the time values are compared in FIG. 11. For the purposes of this example, it is again assumed that the current year is 2007. Because each of the created year, written year, and accessed year are less than the current year, a "No" answer is provided at each of steps 1110, 1114, and 1118, and a "Yes" answer is provided at step 1122. Accordingly, steps 1112, 1116, and 1120 are not performed. The probability is, however, multiplied at step 1124 by 1.2, thereby increasing the probability to 108.

Referring again to FIG. 7, the first character of the filename is checked at step 722. Because it is 0xe5, the probability is multiplied by 1.5 at step 724, thereby increasing the probability to 162. The seventh and eighth characters of the filename are not "~" or a digit, respectively, so a "No" answer is provided at step 726. Thus, 162 is the initial probability, returned at the end of the method 700 in FIG. 7, that the block 1308 is a valid directory entry. It is much more likely, therefore, at least initially, that the block 1308, rather than the block 1304, is a valid directory entry.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and may exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for recovering deleted files in a data store comprising a FAT file system, comprising:
   identifying candidate blocks of a data store, each candidate block comprising a plurality of portions;
   determining for each of the candidate blocks a first probability that the candidate block contains a directory entry based upon one of the plurality of portions;
   determining for each of the candidate blocks a second probability that the candidate block contains a directory entry based upon another one of the plurality of portions;
   combining the first probability and second probability to form a combined probability;
   wherein the first and second probabilities are based on the portion being part of a valid directory entry;
   extracting directory entry metadata for candidate blocks that have a combined probability that is greater than a predetermined probability threshold; and
   recovering the content of a deleted file using the extracted directory entry metadata.

2. The method of claim 1, wherein the candidate blocks comprise at least one of blocks located in unallocated clusters or blocks located in unused portions of allocated clusters.

3. The method of claim 1, one of the plurality of portions comprises a reserved byte and the another one of the plurality of portions comprises an attribute byte; and wherein determining the first and second probabilities comprises testing the reserved byte in the candidate block and testing the attribute byte in the candidate block.

4. The method of claim 1, wherein one of the plurality of portions comprises temporal data; and wherein determining one of the first and second probabilities comprises testing the temporal data in the candidate block.

5. The method of claim 1, wherein one of the plurality of portions comprises a file name; and wherein determining one of the first and second probabilities comprises testing the file name in the candidate block.

6. The method of claim 1, wherein determining one of the first and second probabilities comprises testing for contiguous groups of candidate blocks that have an initial probability that is greater than a predetermined threshold.

7. The method of claim 1, wherein determining one of the first and second probabilities comprises:
assigning initial probabilities for blocks in a cluster by testing the plurality of portions comprising at least a reserved byte, an attribute byte, temporal data, and a file name; and
determining probabilities that are increased from the initial probabilities for contiguous candidate blocks having initial probabilities greater than a predetermined initial probability threshold.

8. The method of claim 1, wherein determining the first and second probabilities comprises:
assigning initial probabilities for blocks in a cluster by testing for each block at least two of the plurality of portions comprising a reserved byte, an attribute byte, temporal data, and a file name; and
determining probabilities that are increased from the initial probabilities for contiguous candidate blocks having initial probabilities greater than a predetermined initial probability threshold.

9. The method of claim 1, wherein determining the first and second probabilities comprises:
assigning initial probabilities for blocks in a cluster by testing for each block at least three of the plurality of portions comprising a reserved byte, an attribute byte, temporal data, and a file name; and
determining probabilities that are increased from the initial probabilities for contiguous candidate blocks having initial probabilities greater than a predetermined initial probability threshold.

10. The method of claim 1, further comprising recovering the content of a deleted file using file information in the extracted metadata.

11. The method of claim 1, further comprising constructing a timeline using temporal information in the extracted metadata.

12. A system for recovering deleted files in a data store comprising a FAT file system, comprising:
a processor;
a candidate block identification module operating on said processor for identifying candidate blocks of a data store, each candidate block comprising a plurality of portions;
a determination module operating on said processor for determining for each of the candidate blocks:
a first probability that the candidate block contains a directory entry based upon one of the plurality of portions,
a second probability that the candidate block contains a directory entry based upon another one of the plurality of portions, and
a combined probability formed by combining the first probability and second probability;
wherein the first and second probabilities are based on the portion being part of a valid directory entry;
an extraction module operating on said processor for extracting directory entry metadata for candidate blocks that have a combined probability that is greater than a predetermined probability threshold; and
recovering the content of a deleted file using the extracted directory entry metadata.

13. The system of claim 12, wherein the candidate blocks comprise at least one of blocks located in unallocated clusters or blocks located in unused portions of allocated clusters.

14. The system of claim 12, wherein one of the plurality of portions comprises a reserved byte and the another one of the plurality of portions comprises an attribute block; and wherein the determination module is configured to determine the first and second probabilities by testing the reserved byte in the candidate block and testing the attribute byte in the candidate block.

15. The system of claim 12, wherein one of the plurality of portions comprises temporal data; and wherein the determination module is configured to determine one of the first and second probabilities by the testing temporal data in the candidate block.

16. The system of claim 12, wherein one of the plurality of portions comprises a file name; and wherein the determination module is configured to determine one of the first and second probabilities by testing the file name in the candidate block.

17. The system of claim 12, wherein the determination module is configured to determine one of the first and second probabilities by testing for contiguous blocks that have an initial probability that is greater than a predetermined threshold.

18. The system of claim 12, wherein the determination module is configured to determine one of the first and second probabilities by:
assigning initial probabilities for blocks in a cluster by testing the plurality of portions comprising a reserved byte, testing an attribute byte, testing temporal data, and a file name; and
determining probabilities that are increased from the initial probabilities for contiguous candidate blocks having initial probabilities greater than a predetermined initial probability threshold.

19. The system of claim 12, wherein the determination module is configured to determine the one of the first and second probabilities by:
assigning initial probabilities for blocks in a cluster by testing for each block at least two of the plurality of portions comprising a reserved byte, an attribute byte, temporal data, and a file name; and
determining probabilities that are increased from the initial probabilities for contiguous candidate blocks having initial probabilities greater than a predetermined initial probability threshold.

20. The system of claim 12, wherein the determination module is configured to determine one of the first and second probabilities by:
assigning initial probabilities for blocks in a cluster by testing for each block at least three of the plurality of portions comprising a reserved byte, an attribute byte, temporal data, and a file name; and
determining probabilities that are increased from the initial probabilities for contiguous candidate blocks having initial probabilities greater than a predetermined initial probability threshold.

21. The system of claim 12, further comprising a recovery module for recovering the content of a deleted file using file information in the extracted metadata.

22. The system of claim 12, further comprising a timeline module for constructing a timeline using temporal information in the extracted metadata.

23. A method for determining whether candidate blocks of a data store are likely to contain a directory entry comprising a FAT file system, comprising:
identifying candidate blocks of a data store, each candidate block comprising a plurality of portions;
assigning initial probabilities to candidate blocks by determining first and second probabilities based upon different ones of the plurality of portions to determine whether the different ones of the plurality of portions meets the criteria associated with a directory entry;
assigning a combined probability by combing the first and second probabilities;
assigning a final probability that is higher than the combined probability to each candidate block in a contiguous group of candidate blocks that each have high combined probabilities;
wherein the first and second probabilities are based on the portion being part of a valid directory entry;
reporting candidate blocks with a final probability greater than a predetermined threshold as a list of blocks that are likely to contain a directory entry; and
recovering the content of a deleted file using the reported candidate blocks.

24. The method of claim 23, wherein the identified candidate blocks comprise at least one of blocks located in unallocated clusters or blocks located in unused portions of allocated clusters.

25. The method of claim 23, wherein one of the plurality of portions comprises a reserved byte and an attribute byte; and wherein assigning the initial probability comprises testing the reserved byte in the candidate block and testing the attribute byte in the candidate block.

26. The method of claim 23, wherein one of the plurality of portions comprises temporal data; and wherein assigning the initial probability comprises testing the temporal data in the candidate block.

27. The method of claim 23, wherein one of the plurality of portions comprises a file name; and wherein assigning the initial probability comprises testing the file name in the candidate block.

28. The method of claim 23, wherein assigning the initial probability comprises testing a reserved byte, testing an attribute byte, testing temporal data, and testing a file name.

29. The method of claim 23, further comprising extracting directory entry metadata for candidate blocks on the list.

30. The method of claim 29, further comprising recovering the content of a deleted file using file information in the extracted metadata.

31. The method of claim 29, further comprising constructing a timeline using temporal information in the extracted metadata.

32. A system for recovering deleted files in a data store comprising a FAT file system, comprising:
a candidate block identification hardware module for identifying candidate blocks of a data store, each candidate block comprising a plurality of portions;
a determination hardware module for determining for each of the candidate blocks first and second probabilities that the candidate block contains a directory entry, based upon different ones of the plurality of portions and for determining a combined probability based on the combination of the first and second probabilities;
wherein the first and second probabilities are based on the portion being part of a valid directory entry;
an extraction hardware module for extracting directory entry metadata for candidate blocks that have a combined probability that is greater than a predetermined probability threshold; and
recovering the content of a deleted file using the extracted directory entry metadata.

33. The system of claim 32, wherein the candidate blocks comprise at least one of blocks located in unallocated clusters or blocks located in unused portions of allocated clusters.

34. The system of claim 32, wherein the plurality of portions comprises a reserved byte and an attribute byte; and wherein the determination hardware module is configured to determine the first and second probabilities by testing the reserved byte in the candidate block and testing the attribute byte in the candidate block.

35. The system of claim 32, wherein one of the plurality of portions comprises temporal data; and wherein the determination hardware module is configured to determine one of the first and second probabilities by the testing temporal data in the candidate block.

36. The system of claim 32, wherein one of the plurality of portions comprises a file name; and wherein the determination hardware module is configured to determine one of the first and second probabilities by testing the file name in the candidate block.

37. The system of claim 32, wherein the determination hardware module is configured to determine one of the first and second probabilities by testing for contiguous blocks that have an initial probability that is greater than a predetermined threshold.

38. The system of claim 32, wherein the determination hardware module is configured to determine one of the first and second probabilities by:
assigning initial probabilities for blocks in a cluster by testing the plurality of portions comprising a reserved byte, testing an attribute byte, testing temporal data, and a file name; and
determining probabilities that are increased from the initial probabilities for contiguous candidate blocks having initial probabilities greater than a predetermined initial probability threshold.

39. The system of claim 32, wherein the determination hardware module is configured to determine the first and second probabilities by:
assigning initial probabilities for blocks in a cluster by testing for each block at least two of the plurality of portions comprising a reserved byte, an attribute byte, temporal data, and a file name; and
determining probabilities that are increased from the initial probabilities for contiguous candidate blocks having initial probabilities greater than a predetermined initial probability threshold.

40. The system of claim 32, wherein the determination hardware module is configured to determine the first and second probabilities by:
assigning initial probabilities for blocks in a cluster by testing for each block at least three of the plurality of portions comprising a reserved byte, an attribute byte, temporal data, and a file name; and
determining probabilities that are increased from the initial probabilities for contiguous candidate blocks having initial probabilities greater than a predetermined initial probability threshold.

41. The system of claim 32, further comprising a recovery hardware module for recovering the content of a deleted file using file information in the extracted metadata.

42. The system of claim 32, further comprising a timeline hardware module for constructing a timeline using temporal information in the extracted metadata.

* * * * *